United States Patent [19]
Inazuka

[11] Patent Number: 6,104,882
[45] Date of Patent: Aug. 15, 2000

[54] CAMERA HAVING A BUILT-IN RETRACTABLE FLASH

[75] Inventor: Masahiro Inazuka, Chiba ken, Japan

[73] Assignee: Asahi Kogaku Kogyo Kabushiki Kaisha, Tokyo, Japan

[21] Appl. No.: 09/015,792

[22] Filed: Jan. 29, 1998

[30] Foreign Application Priority Data

Jan. 30, 1997 [JP] Japan .................................... 9-016651
Feb. 14, 1997 [JP] Japan .................................... 9-030305
Feb. 14, 1997 [JP] Japan .................................... 9-030306

[51] Int. Cl.$^7$ .......................... G03B 15/03; G03B 17/04
[52] U.S. Cl. .......................... 396/177; 396/349; 396/539
[58] Field of Search .................... 396/176, 177, 396/178, 349, 539

[56] References Cited

U.S. PATENT DOCUMENTS

| | | | |
|---|---|---|---|
| 4,893,140 | 1/1990 | Yamamoto et al. | 396/177 |
| 4,910,542 | 3/1990 | Yamamoto et al. | 396/165 |
| 4,916,475 | 4/1990 | Hori | 396/62 |
| 4,920,368 | 4/1990 | Arai et al. | 396/177 |
| 4,951,074 | 8/1990 | Ueda | 396/176 X |
| 5,055,866 | 10/1991 | Takebayashi | 396/177 X |
| 5,065,177 | 11/1991 | Yamamoto et al. | 396/177 |
| 5,066,967 | 11/1991 | Yamamoto et al. | 396/177 |
| 5,079,574 | 1/1992 | Ueno | 396/177 |
| 5,134,433 | 7/1992 | Takami et al. | 396/176 X |
| 5,142,465 | 8/1992 | Sato | 396/177 X |
| 5,233,378 | 8/1993 | Hosokawa et al. | 396/177 |
| 5,245,374 | 9/1993 | Hosokawa et al. | 396/177 |
| 5,253,004 | 10/1993 | Umetsu et al. | 396/177 |
| 5,287,135 | 2/1994 | Arai et al. | 396/176 X |
| 5,463,437 | 10/1995 | Takami | 396/177 |
| 5,471,370 | 11/1995 | Takami | 396/178 X |
| 5,565,941 | 10/1996 | Kaneko | 396/177 |
| 5,749,003 | 5/1998 | Tanabe | 396/177 |
| 5,754,897 | 5/1998 | Suzuki et al. | 396/177 |

*Primary Examiner*—W. B. Perkey
*Attorney, Agent, or Firm*—Greenblum & Bernstein, P.L.C.

[57] ABSTRACT

Disclosed is a camera which includes: a built-in retractable flash movable between a retracted position and a raised position; a lens barrel movable between a retracted position and an advanced position; and a linkage mechanism that links the retractable flash with the movable lens barrel to move the retractable flash between the retracted position and the raised position when the movable lens barrel moves between the retracted position and the advanced position, respectively.

37 Claims, 16 Drawing Sheets

CAMERA HAVING A BUILT-IN RETRACTABLE FLASH

BACKGROUND OF THE INVENTION

1. Field of the Invention

The present invention relates to a camera having a built-in retractable flash.

2. Description of the Related Art

A camera having a built-in retractable flash is well-known. The built-in retractable flash is manually raised or automatically rises from the camera body when needed.

A particular type of built-in retractable flash (built-in pop-up flash) is also known which automatically rises into place by the spring force of a spring member upon manually depressing a knob or button provided on the camera body. With the camera having such type of flash the user simply depresses the knob or button to raise the flash when they desire to use it. However, with such type of flash the user has to retract the flash manually, which is troublesome. Further, with such type of flash it is sometimes the case that the user forgets to raise the flash into place when it is necessary to use it.

In a conventional compact camera having a built-in flash, it is general that the camera automatically fires the flash in dim light in a normal photographic mode and that the camera fires or does not fire the flash at each shot in a specified photographic mode (e.g., a compulsive-flash mode or a flash-prohibition mode). Conventionally such a specified photographic mode is manually selected by pressing a special knob or button provided on the camera body. Accordingly, in a compact camera having a built-in retractable flash, the flash preferably rises and retracts automatically when the main switch (not shown) of the camera is turned ON and OFF, respectively. However, it is difficult to incorporate such a mechanism for automatically raising or retracting the flash within a small compact camera without increasing the size of the camera body.

In order to miniaturize a camera, each internal component of the camera must be space-efficiently arranged in the camera body. A compact camera that offers higher levels of sophistication and performance is usually made up of a large number of components, which makes it more difficult to space-efficiently arrange each inside component of the camera within a small camera body. Specifically, it is difficult to space-efficiently arrange a battery cell or cells in a small camera body because a cell used for cameras generally has an elongated cylindrical shape.

In the case of a camera having the built-in retractable flash in which the casing of the flash itself is pivoted directly to the camera body, the flash cannot be raised from the camera body by a height over the height or length of the casing. It is well-known that the red-eye phenomenon tends to occur when the optical axis of the flash is not sufficiently apart from the optical axis of the photographic lens. Further, in the case where the lens barrel is of an extendable type of zoom lens barrel, it is well-known that the flashlight is partly interrupted by the tip of the extended lens barrel when the optical axis of the flash is not sufficiently apart from the optical axis of the photographic lens. In order to prevent such problems, there has been proposed a camera having the built-in retractable flash in which the casing of the flash is movably connected to the camera body through a linking mechanism so as to raise the flash higher than the height or length of the casing from the camera body. However, to provide such a linking mechanism in the camera body, it is usually necessary to provide a plurality of fixed pivots and some other elements on the camera body, which makes it difficult to space-efficiently arrange and design the flash. Furthermore, with such a linking mechanism it is difficult to stably and rigidly hold the built-in retractable flash in its raised operable position because the linking mechanism is generally provided with a plurality of pivoted shafts which are very complex in their movements, which is a disadvantage to securing a sufficient strength of the linking mechanism.

SUMMARY OF THE INVENTION

An object of the present invention is to provide a camera which is provided with a built-in retractable flash having a simple mechanism and being driven automatically between a retracted position and an operable position.

Another object of the present invention is to provide a camera having a built-in retractable flash in which each inside element of the camera is space-efficiently arranged to miniaturize the camera.

Yet another object of the present invention is to provide a camera having a built-in retractable flash in which the casing of the flash is movably connected to the camera body through a simple and strong linking mechanism.

According to an aspect of the present invention, there is provided a camera which includes: a built-in retractable flash movable between a retracted position and a raised position; a lens barrel movable between a retracted position and an advanced position; and a linkage mechanism that links the retractable flash with the movable lens barrel to move the retractable flash between the retracted position and the raised position when the movable lens barrel moves between the retracted position and the advanced position, respectively.

Preferably, the linkage mechanism includes a slidable member that is guided in a direction of movement of the movable lens barrel, wherein the slidable member is associated with the movable lens barrel to move in the direction forwardly and rearwardly when the movable lens barrel moves to the advanced position and the retracted position, respectively.

Preferably, the camera further includes a spring for continuously biasing the slidable member forwardly, wherein the movable lens barrel pushes the slidable member rearwardly against a spring force of the spring when the movable lens barrel moves from the advanced position to the retracted position, and wherein the slidable member is moved forwardly by the spring force of the spring when the movable lens barrel moves from the retracted position to the advanced position.

Preferably, the linkage mechanism includes at least one linkage lever, one end and the other end of which being rotatably connected to a camera body of the camera and a casing of the retractable flash, respectively.

Preferably, the linkage mechanism further includes a spring for continuously biasing the at least one linkage lever to rotate in a direction to move the retractable flash towards the raised position.

Preferably, an upper surface of the retractable flash is substantially flush with an upper surface of a camera body of the camera when the retractable flash is in the retracted position.

Preferably, the movable lens barrel is driven to move from the retracted position to the advanced position when a main switch of the camera is turned ON, wherein the movable lens barrel is driven to move from the advanced position to the retracted position when the main switch of the camera is turned OFF.

Preferably, the camera further includes: a flash accommodation space, formed in a camera body, for accommodating the retractable flash positioned in the retracted position; and a battery chamber for accommodating at least one battery cell, the battery chamber being formed behind the accommodation space in the camera body.

Preferably, the camera further includes a spool chamber in which a film take-up spool is rotatably supported, wherein the flash accommodation space and the battery chamber are formed above the spool chamber.

According to another aspect of the present invention, there is provided a camera which includes: a built-in retractable flash movable between a retracted position in which the retractable flash is retracted into a flash accommodation space formed in a camera body and a raised position in which the retractable flash is raised above the flash accommodation space; and a battery chamber for accommodating at least one battery cell, the battery chamber being formed behind the accommodation space in the camera body.

According to yet another aspect of the present invention, there is provided a camera which includes: a built-in retractable flash movable between a retracted position and a raised position; and a mechanism for moving the retractable flash between the retracted position and the raised position, wherein the mechanism includes at least one linkage lever, one end and the other end of which being rotatably connected to a camera body of the camera and a casing of the retractable flash, respectively, and a cam plate, fixed to the camera body, for supporting the at least one linkage lever.

According to yet another aspect of the present invention, there is provided a camera which includes: a built-in retractable flash movable between a retracted position and a raised position; a pair of primary levers, one end and the other end of each of the pair of primary levers being rotatably connected to a camera body of the camera and a casing of the retractable flash, respectively; a pair of L-shaped levers, a bent portion of each of the pair of L-shaped levers being rotatably connected to a part of a corresponding one of the pair of primary levers between the one end and the other end thereof, one end of each of the pair of L-shaped levers being rotatably connected to the casing of the retractable flash, and the other end of one of the pair of L-shaped levers being provided with a follower pin; a cam plate fixed to the camera body and including a cam groove with which the follower pin is engaged so that the follower pin is guided along the cam groove; and a third lever, one end and the other end of which being rotatably connected to the other end of the other of the pair of L-shaped levers and the camera body, respectively.

The present disclosure relates to subject matter contained in Japanese Patent Applications No. 9-16651 (filed on Jan. 30, 1997), No. 9-30305 (filed on Feb. 14, 1997) and No. 9-30306 (filed on Feb. 14, 1997) which are expressly incorporated herein by reference in their entireties.

BRIEF DESCRIPTION OF THE DRAWINGS

The present invention will be described below in detail with reference to the accompanying drawings in which similar elements are indicated by similar reference numerals, and wherein.

DESCRIPTION OF THE PREFERRED EMBODIMENTS

Figure 1:
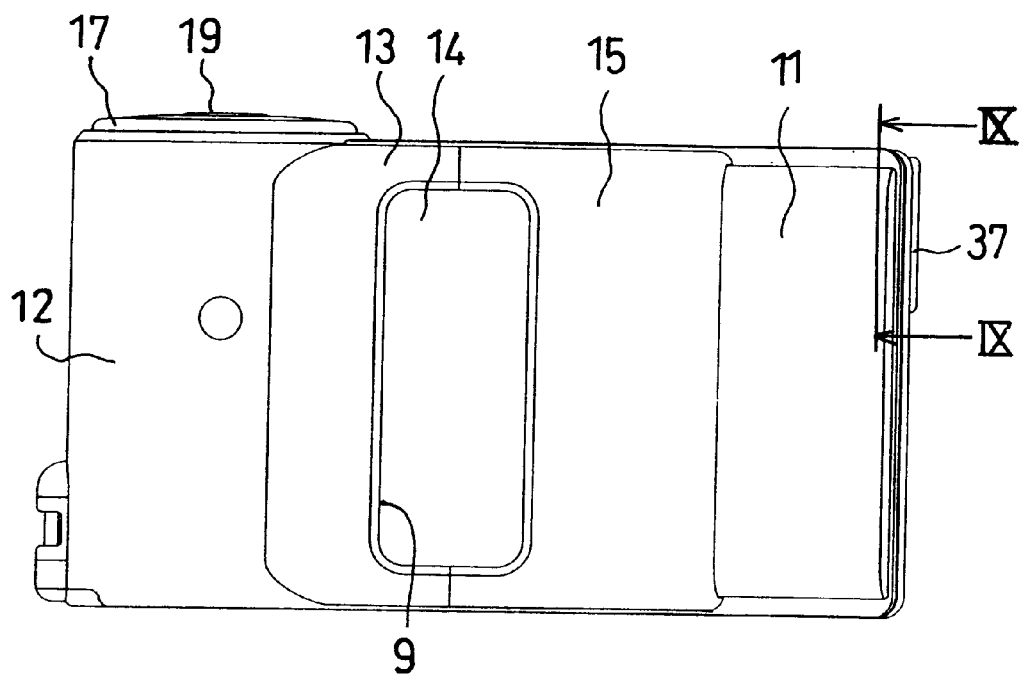
FIG. 1 is a front elevational view of a camera having a built-in retractable flash to which the present invention is applied, showing the camera with a zoom lens barrel thereof being retracted in the camera body and with the front end of the zoom lens barrel being covered by primary and auxiliary lens covers.

FIGS. 1 through 5 show various elevations of a first embodiment of a compact camera, seen from different angles. The camera 10 is provided with a built-in retractable flash 25. The camera 10 is of a type which employs an Advanced Photo System film cassette. Namely, the camera 10 uses the recently-developed APS (advanced photo system) type film cassette.

The camera 10 is provided on the front at an approximate center thereof with a zoom lens barrel 21 which is driven to extend forwardly from and retract into a camera body 11 by a zoom motor (not shown) provided in the camera body 11. The zoom lens barrel 21 is of a telescoping type which is comprised of two movable barrels, i.e., an outer barrel 21b and an inner barrel 21a which is slidably fitted in the outer barrel 21b (see FIG. 3). The zoom lens barrel 21 is fully retracted into the camera body 11 to stay in a retracted position (accommodated position) when the main switch of the camera 10 is OFF, i.e., the camera 10 is in a state shown in FIG. 1. Upon the main switch of the camera 10 being turned ON, the zoom lens barrel 21 (both the outer and inner barrels 21a and 21b) is slightly advanced from the camera body 11 by a predetermined amount to be positioned in a wide-angle photographing position (wide-angle position).

Figure 2:
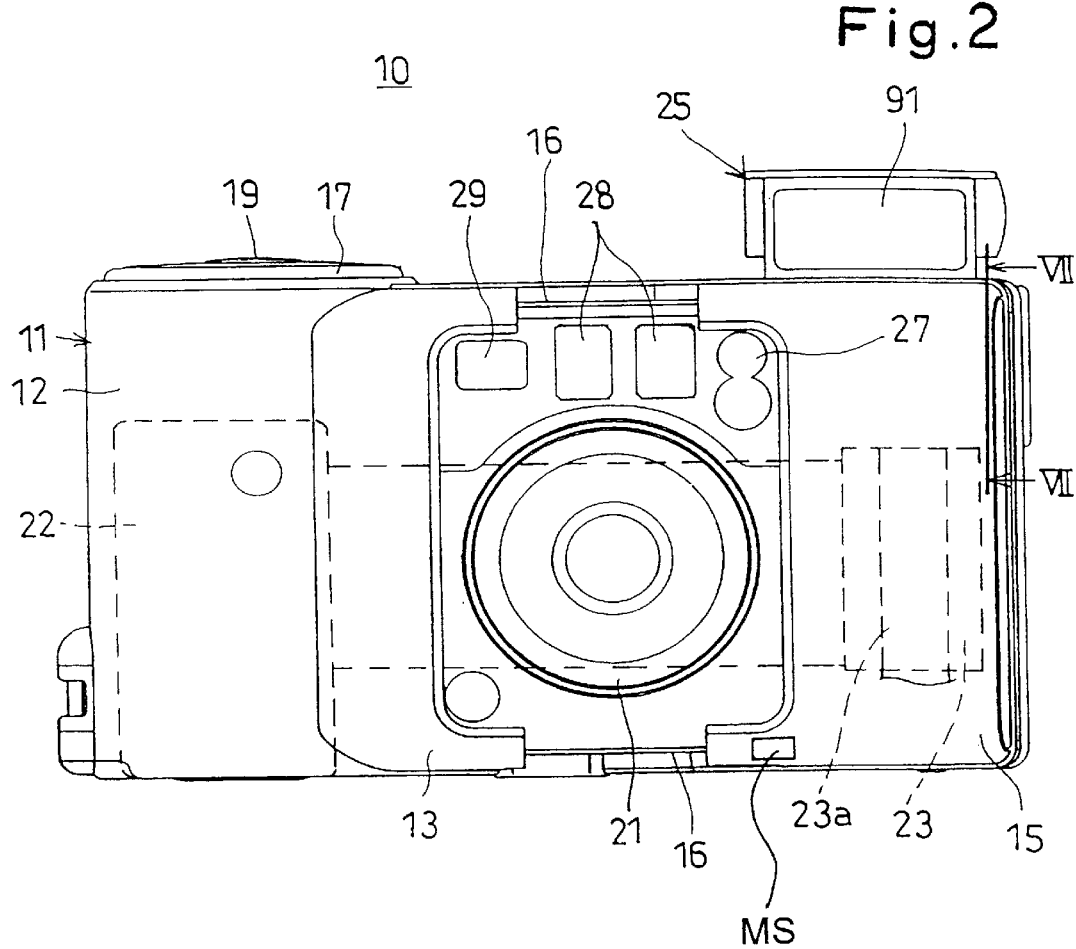
FIG. 2 is a front elevational view of the camera shown in FIG. 1, showing the camera in a photographable condition.
Figure 3:
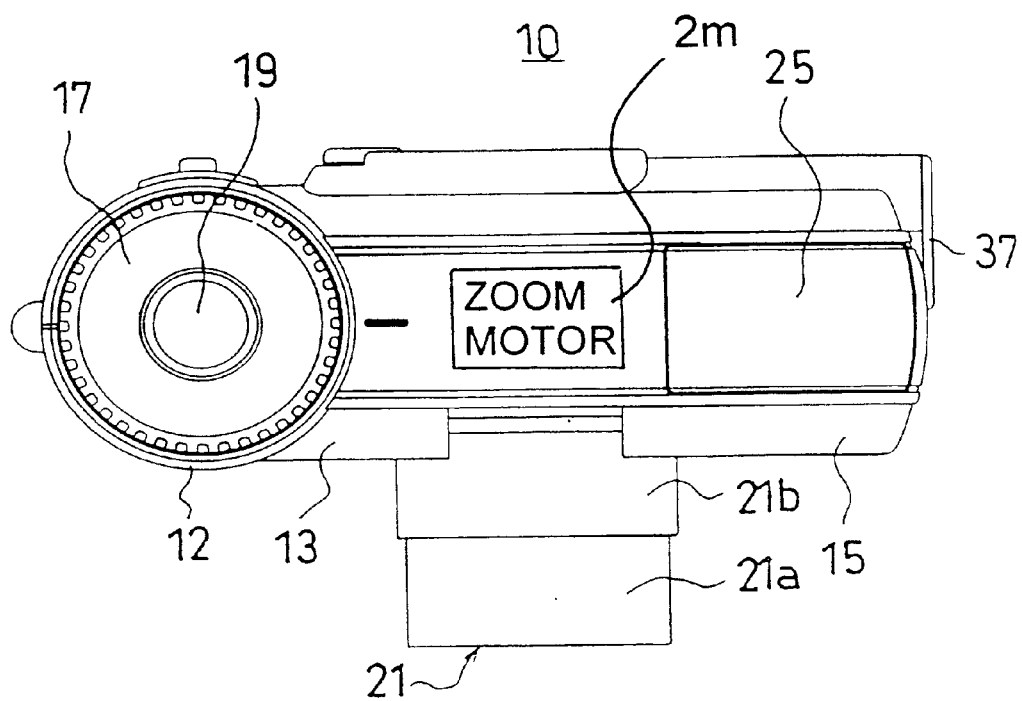
FIG. 3 is a top view of the camera shown in FIG. 2.

The camera body 11 is provided on the front thereof with a fixed cover 13, an auxiliary sliding cover (auxiliary lens cover) 14 and a primary sliding cover (primary lens cover) 15. The fixed cover 13 is secured to the front of the camera body 11. The primary sliding cover 15 is guided in a widthwise direction of the camera body 11 (horizontal direction as viewed in FIG. 1) by the two parallel guiding rails 16 (see FIG. 2) formed on the front at upper and lower ends of the camera body 11. The auxiliary sliding cover 14 is supported by the primary sliding cover 15 to be slidable in the widthwise direction of the camera body 11 relative to the primary sliding cover 15. The auxiliary sliding cover 14 is connected to the primary sliding cover 15 through a linking mechanism (not shown) for sliding the auxiliary sliding cover 14 relative to the primary sliding cover 15 when the primary sliding cover 15 is manually slid. With the linking mechanism, when the primary sliding cover 15 is fully closed to contact the fixed cover 13 as shown in FIG. 1, the auxiliary sliding cover 14 extends from the primary sliding cover 15 to fully close a vertical rectangular opening 9 formed at the front of the camera body 11 between the fixed cover 13 and the primary sliding cover 15. In this state shown in FIG. 1, manually opening the primary sliding cover 15 in a direction to the right as viewed in FIG. 1 causes the auxiliary sliding cover 14 to move simultaneously in the same direction so that the auxiliary sliding cover 14 retracts into a space behind the primary sliding cover 15, i.e., a space formed between the primary sliding cover 15 and the camera body 11. FIG. 2 shows the camera 10 in a photographable condition in which the primary sliding cover 15 together with the auxiliary sliding cover 14 is fully opened to expose the zoom lens barrel 21.

The main switch (not shown) of the camera 10 is associated with the primary sliding cover 15 so that the main switch is turned ON and OFF when the primary sliding cover 15 is opened and closed, respectively. Specifically, the main switch is turned ON when the primary sliding cover 15 passes a predetermined point within a slidable range of the primary sliding cover 15 immediately before the primary sliding cover 15 is fully opened. Conversely, the main switch is turned OFF when the fully opened primary sliding cover 15 is slightly moved in a direction to close the same. Upon the main switch being turned ON, the zoom motor is actuated to slightly advance the zoom lens barrel 21 (outer and inner barrels 21a and 21b) to the aforementioned wide-angle photographing position. When the zoom lens barrel 21 is in its wide-angle photographing position, the front end of the zoom lens barrel 21 is positioned slightly ahead of the front face of the primary sliding cover 15. Conversely, upon the main switch being turned OFF, the zoom motor is actuated to retract the zoom lens barrel 21 into the camera body 11.

When the main switch is ON, the zoom lens barrel 21 can advance and retreat within a predetermined zooming range between the wide-angle photographing position and a telephoto photographing position (fully-extended position).

The camera body 11 is provided on one side thereof with a grip portion 12. The camera 10 is provided at the top of the grip portion 12 with a select dial 17 which can be manually rotated in steps for selecting one of a plurality of photographic modes including Auto-flash mode, Flash prohibition mode, Flash-compulsive mode, etc. The camera 10 is provided at the center of the select dial 17 with a shutter release button 19. When the shutter release button 19 is half depressed, a first switch (not shown) is turned ON to perform a photometering operation and an object distance measuring operation. Subsequently, when the shutter release button 19 is fully depressed, a second switch (not shown) is turned ON to perform a shutter releasing operation and a film winding operation.

The camera 10 is provided, on the front face of the camera body 11 above the zoom lens barrel 21, with a photometering window 27, an autofocus window 28 and a finder objective window 29. These windows 27, 28 and 29 are all covered and uncovered by the auxiliary and primary sliding covers 14 and 15 when the primary sliding cover 15 is closed and opened, respectively.

The camera 10 is provided on the rear face of the camera body 11 with an LCD panel 31 (see FIG. 4) which indicates various photographic information, e.g., the currently selected exposure mode, film status information, flash information, frame number information and battery information. The camera body 11 is provided on the rear face thereof above the LCD panel 31 with a finder eyepiece window 32, a photo-size selector dial 33 and a zooming knob 34. With the main switch of the camera ON, the zoom lens barrel 21 extends and retreats by manually shifting the zooming knob 34 from its center neutral position to the right and to the left, respectively.

Figure 4:
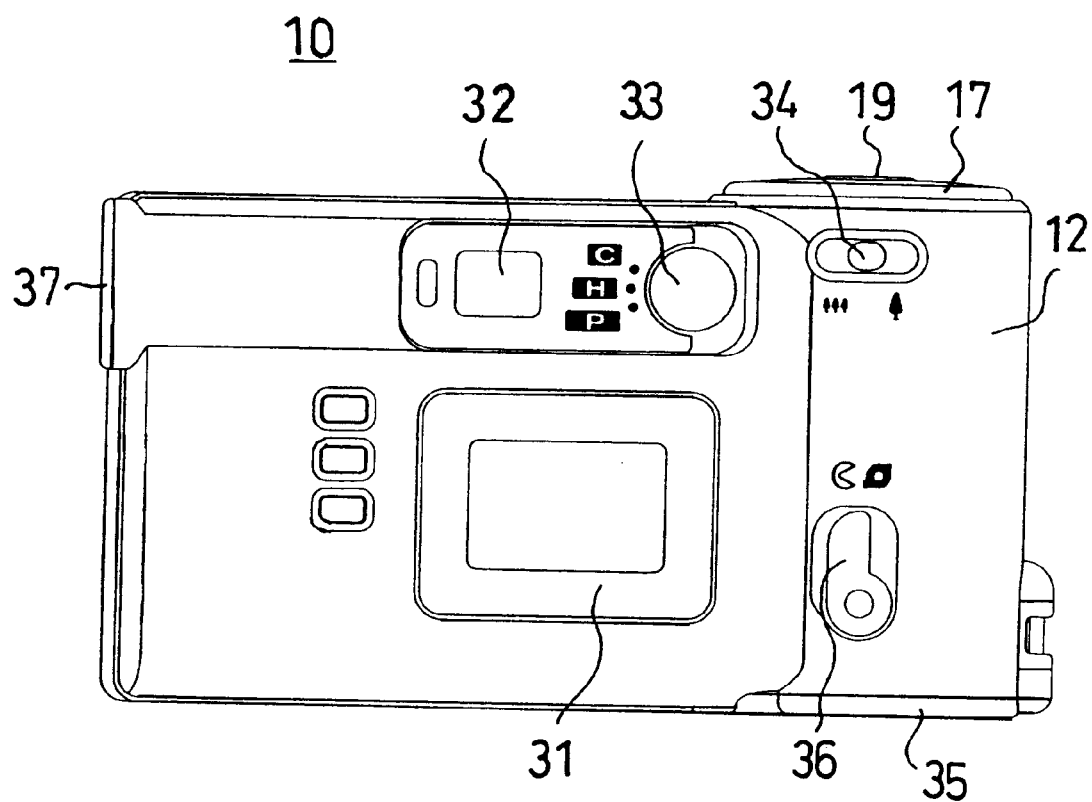
FIG. 4 is a rear elevational view of the camera shown in FIG. 1 or 2.
Figure 5:
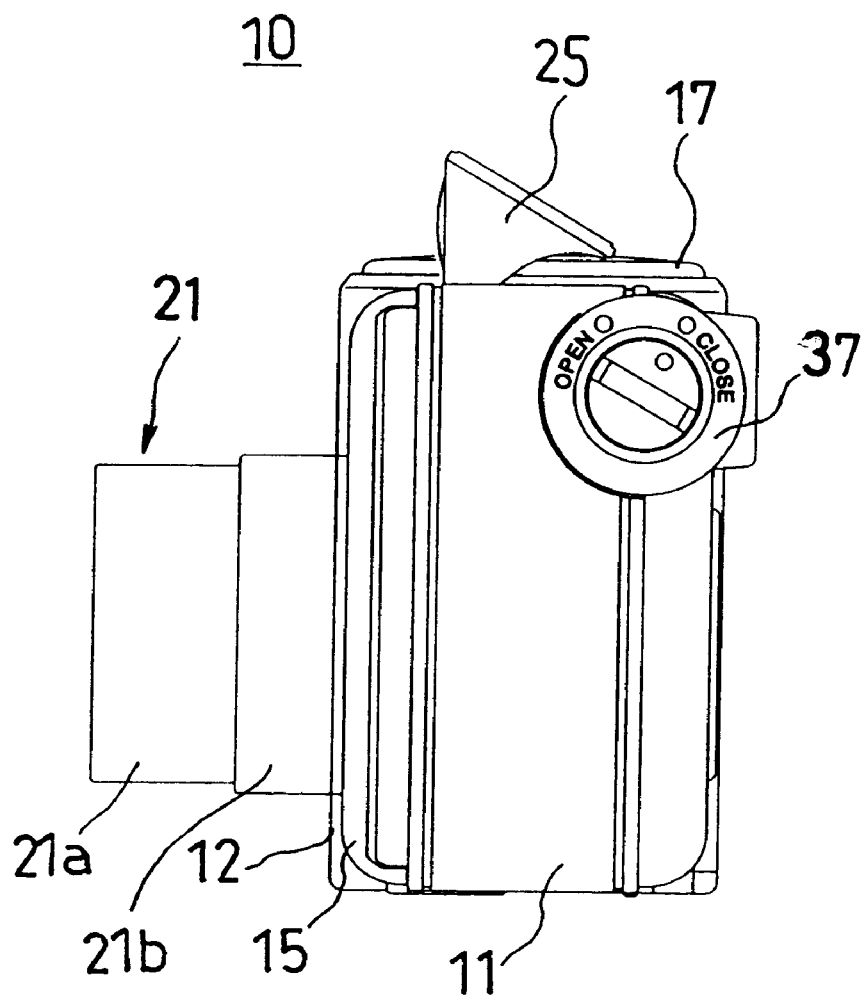
FIG. 5 is a side elevational view of the camera shown in FIG. 2 or 3.

The camera body 11 is provided inside the camera body 11 on one side and the other side thereof with a film chamber 22 and a spool chamber 23, respectively (see FIG. 2). The camera body 11 is provided at the bottom of the film chamber 22 with a film door 35 (see FIG. 4) which opens and closes the bottom opening of the film chamber 22. With the film door 35 being opened an APS type film cassette (not shown) is inserted into or taken out of the film chamber 22 through the bottom opening of the film chamber 22. In the spool chamber 23 a film take-up spool 23a is rotatably supported. As shown in FIG. 4, the camera body 11 is provided on the back below the zooming knob 34 with a lock release lever 36 which unlocks the closed film door 35.

The length (height) of the camera body 11 is determined to be longer than the length of the film chamber 22 as can be seen from FIG. 2. The length of the spool chamber 23 having the film take-up spool 23a thereinside is shorter than the length of the film chamber 22, so that a flash accommodation space 41 can be secured in the camera body 11 that is large enough to accommodate the built-in retractable flash 25 above the spool chamber 23, as can be seen from FIGS. 7 through 9. A battery chamber 40 is formed behind the flash accommodation space 41 above the spool chamber 23.

Figure 7:
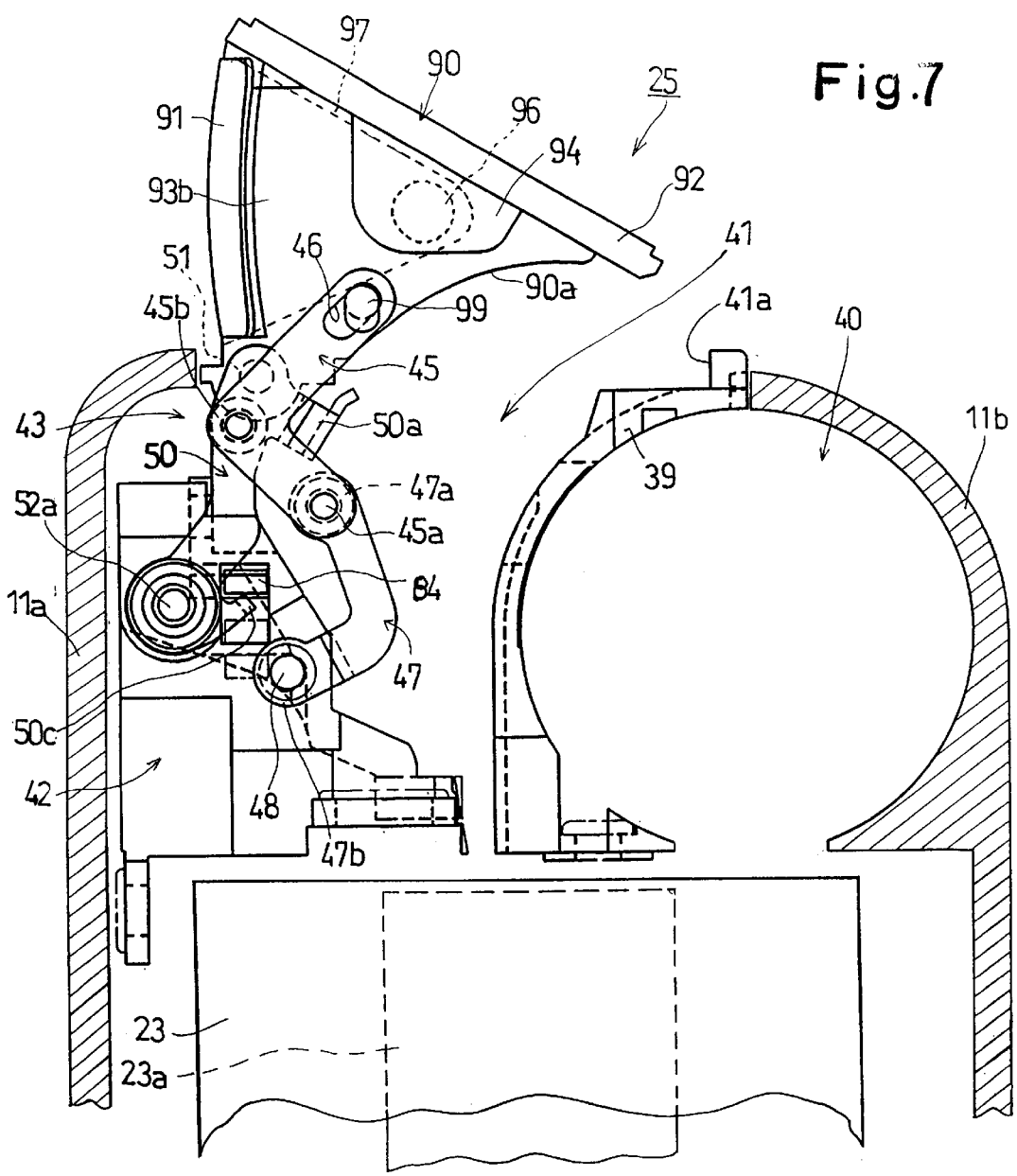
FIG. 7 is a cross sectional view taken along VII—VII line shown in FIG. 2.
Figure 8:
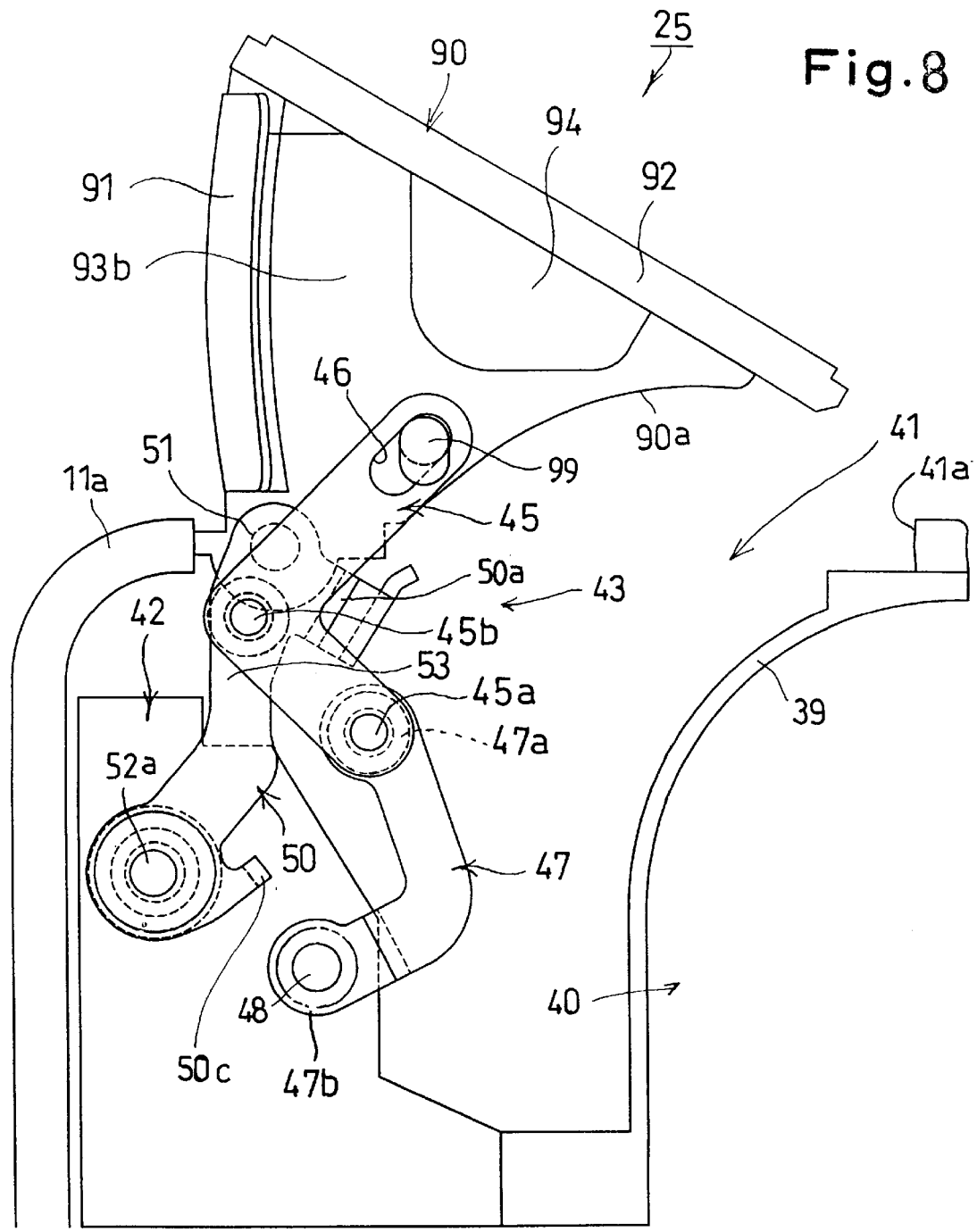
FIG. 8 is an enlarged view of a part of the cross sectional view shown in FIG. 7.
Figure 9:
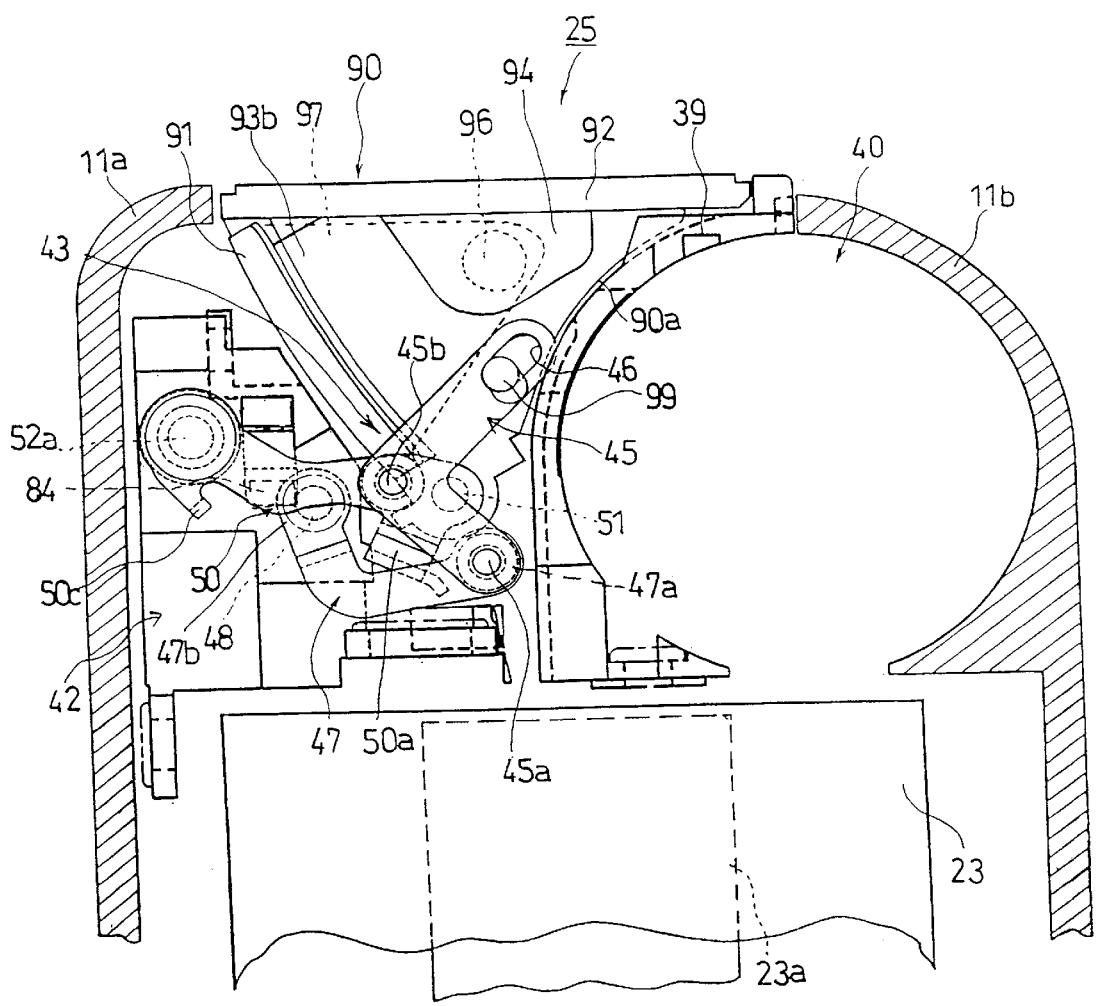
FIG. 9 is a cross sectional view taken along IX—IX line shown in FIG. 1.
Figure 10:
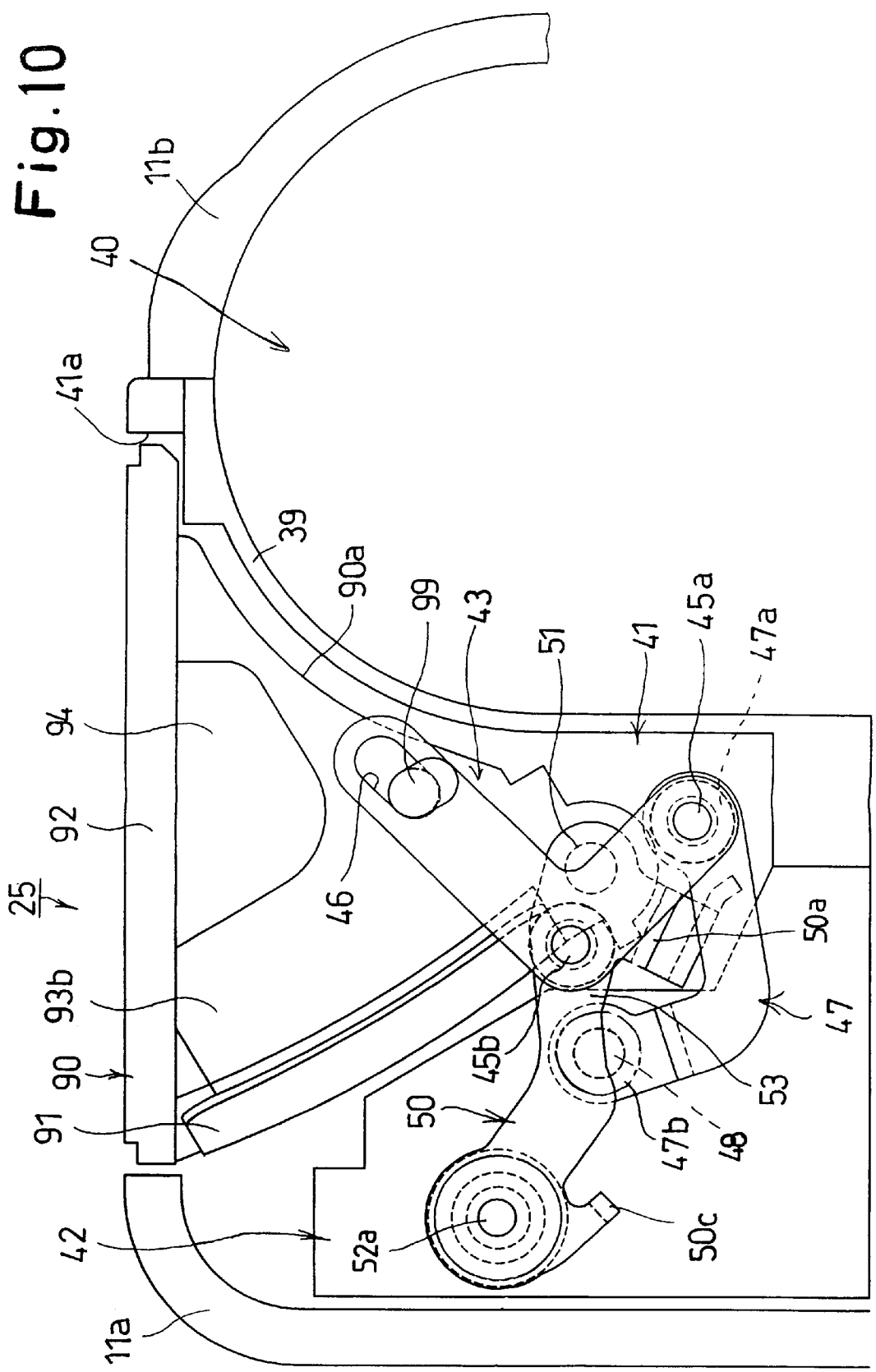
FIG. 10 is an enlarged view of a part of the cross sectional view shown in FIG. 9.

As shown in FIG. 7, 8 or 9 a supporting member 42 which supports the flash 25 is secured to an inner surface of the front wall 11a of the camera body 11. The camera body 11 is provided behind the supporting member 42 with a curved wall 39 which forms a part of the cylindrical wall forming the battery chamber 40. The flash accommodation space 41 is formed in the camera body 11 between the supporting member 42 and the curved wall 39. The flash accommodation space 41 is opened at the upper wall of the camera body 11, so that an upper opening 41a is formed at the top of the camera body 11.

The battery chamber 40, which is formed between the curved wall 39 and a part of a rear wall 11b of the camera body 11, has a cylindrical shape and extends in the widthwise direction of the camera body 11. Accordingly, the axial center of the battery chamber 40 extends substantially parallel to an image plane of the film which is to be exposed when the shutter is released. The camera body 11 is provided on one side (on the right side as viewed in FIG. 1) with a circular battery cover 37 (see FIG. 5) which opens and closes an opening of the battery chamber 40. A cylindrical battery cell (not shown) is inserted into or taken out of the battery chamber 40 with the battery cover 37 being opened. In this particular embodiment of the camera 10, the cylindrical battery cell used is a three-volt lithium type battery "CR2". However, the battery cell may be replaced by a similar type of cell.

The flash 25 is composed of a flashlight emitter block 90 and a pair of linking mechanisms 43 for supporting the flashlight emitter block 90 in a movable manner. The flashlight emitter block 90 is automatically raised into place or retracted into the flash accommodation space 41 by the movement of the zoom lens barrel 21 in the optical axis direction thereof. The mechanism for moving the flashlight emitter block 90 in such a manner will be hereinafter discussed with reference to FIGS. 6 through 12.

The flashlight emitter block 90 is provided with a xenon tube 96 and a reflector 97 positioned behind the xenon tube 96. The flashlight emitter block 90 is further provided in front of the xenon tube 96 with a flash lens 91. As shown in FIG. 7 or 9, the reflector 97 has a V-shape cross section which widens towards the flash lens 91. Side walls 93a and 93b of the flashlight emitter block 90 are each formed in the shape of a sector corresponding to the cross sectional shape of the reflector 97. Each of the side walls 93a and 93b is provided with a bulged portion 94 (see FIG. 6) in which the corresponding end of the xenon tube 96 is positioned. The flashlight emitter block 90 is provided at the top thereof with a flat roof wall 92 which forms a part of the upper wall of the camera body 11 when the flash 25 is in its retracted position. A bottom wall 90a of the flashlight emitter block 90 is formed as a curved wall which corresponds to and is adjacent to the curved wall 39 when the flashlight emitter block 90 is in its retracted position.

The flashlight emitter block 90 is connected to the camera body 11 through the pair of linking mechanisms 43. The pair of linking mechanisms 43 respectively support the side walls 93a and 93b. Each of the linking mechanisms 43 is composed of a primary lever 50, an L-shaped lever 45 and a C-shaped lever 47.

Each of the side walls 93a and 93b is provided with a pivot 51 about which one end (outer end) of the corresponding primary lever 50 is pivoted. The pivots 51 of the side walls 93a and 93b lie on a common line extending in the widthwise direction of the camera body 11. Namely, the pivots 51 are coaxially positioned. The supporting member 42 is provided with pivots 52a which lie on a common line extending parallel to the pivots 51 of the side walls 93a and 93b. The other end (inner end) of each primary lever 50 is pivoted about its corresponding pivot 52a, so that the outer end of each primary lever 50 moves along a path in the shape of a circular arc when the primary lever 50 swings about the corresponding pivot 52a.

Each of the side walls 93a and 93b is provided in the vicinity of the corresponding pivot 51 with a pin 99. Each of the L-shaped levers 45 is provided at one end (upper end) thereof with an elongated hole 46 in which the corresponding pin 99 is slidably positioned. Each of the primary levers 50 is provided in the vicinity of the pivot 51 thereof with a pivot 45b about which a bent portion of the corresponding L-shaped lever 45 is pivoted. The other end (lower end) of each L-shaped lever 45 is rotatably connected to one end 47a of the corresponding C-shaped lever 47 through a pivot 45a. The supporting member 42 is further provided with pivots 48 which lie on a common line extending parallel to the pivots 52a, and the other end 47b of each C-shaped lever 47 is pivoted about its corresponding pivot 48. In accordance with the C-shaped levers 47, the position of each L-shaped lever 45 is determined while it is being moved due to the rotation of each primary lever 50 about the corresponding pivot 52a. The two primary levers 50 are connected with each other through a connecting bar 50a (shown by the diagonal sectioned lines in FIG. 6) so as to swing together.

The operation of the pair of linking mechanisms 43 will be hereinafter discussed. The pair of linking mechanisms 43 are the same as mentioned before, so that only the operation of one of the pair of linking mechanisms 43 which supports the side wall 93a (left side wall 93a as viewed in FIG. 6) will be hereinafter discussed.

Supposing that the rotational center (pivot 52a) of the primary lever 50 is point A, the pivotal center (pivot 45b) of the L-shaped lever 45 at the bent portion thereof is point B, the pivotal center (pivot 45a) between the L-shaped lever 45 and the C-shaped lever 47 is point C, and the rotational center (pivot 48) of the C-shaped lever 47 is point D, the points A and D are fixed points relative to the supporting member 42 while the total length of the following four lines AB, BC, CD AND DA is constant. Therefore, the path of the movement of the second line between the points B and C (i.e., the shorter leg of the L-shaped lever 45) is constant when the primary lever 50 swings between a retracted position of the primary lever 50 shown in FIG. 9 and the upright position of the primary lever 50 shown in FIG. 7. Due to the structure in which the pin 99 is rotatably connected to the upper end of the L-shaped lever 45 while the pivot 51 is rotatably connected to the outer end of the primary lever 50, the flashlight emitter block 90 is moved up and down through the pivots 51 when the pair of primary levers 50 swing. During this swinging movement of the pair of primary levers 50, the position and posture of the flashlight emitter block 90 are controlled by the pair of L-shaped levers 45 and the pair of C-shaped levers 47. Accordingly, the flashlight emitter block 90 is moved up and down through the pair of linking mechanisms 43 between the popped-up position or operable position (the position shown in FIG. 7 or 11), where the flashlight emitter block 90 is raised into place with the flash lens facing a photographic subject ahead of the camera 10, and the retracted position (the position shown in FIG. 9 or 12), where the flashlight emitter block 90 is retracted into the flash accommodation space 41 of the camera body 11, with the upper surface of the roof wall 92 of the flashlight emitter block 90 being substantially flush with the upper surface of the camera body 11. When the flashlight emitter block 90 is in its retracted position, the curved bottom wall 90a corresponds to and is adjacent to the curved wall 39.

The camera 10 is further provided on one side (the left side as viewed in FIG. 6) of the supporting member 42 with a mechanism for driving the pair of linking mechanisms 43 by utilizing the movement of the zoom lens barrel 21 in the optical axis direction. The details of this driving mechanism will be hereinafter discussed with reference to mainly FIGS. 11 and 12.

Figure 11:
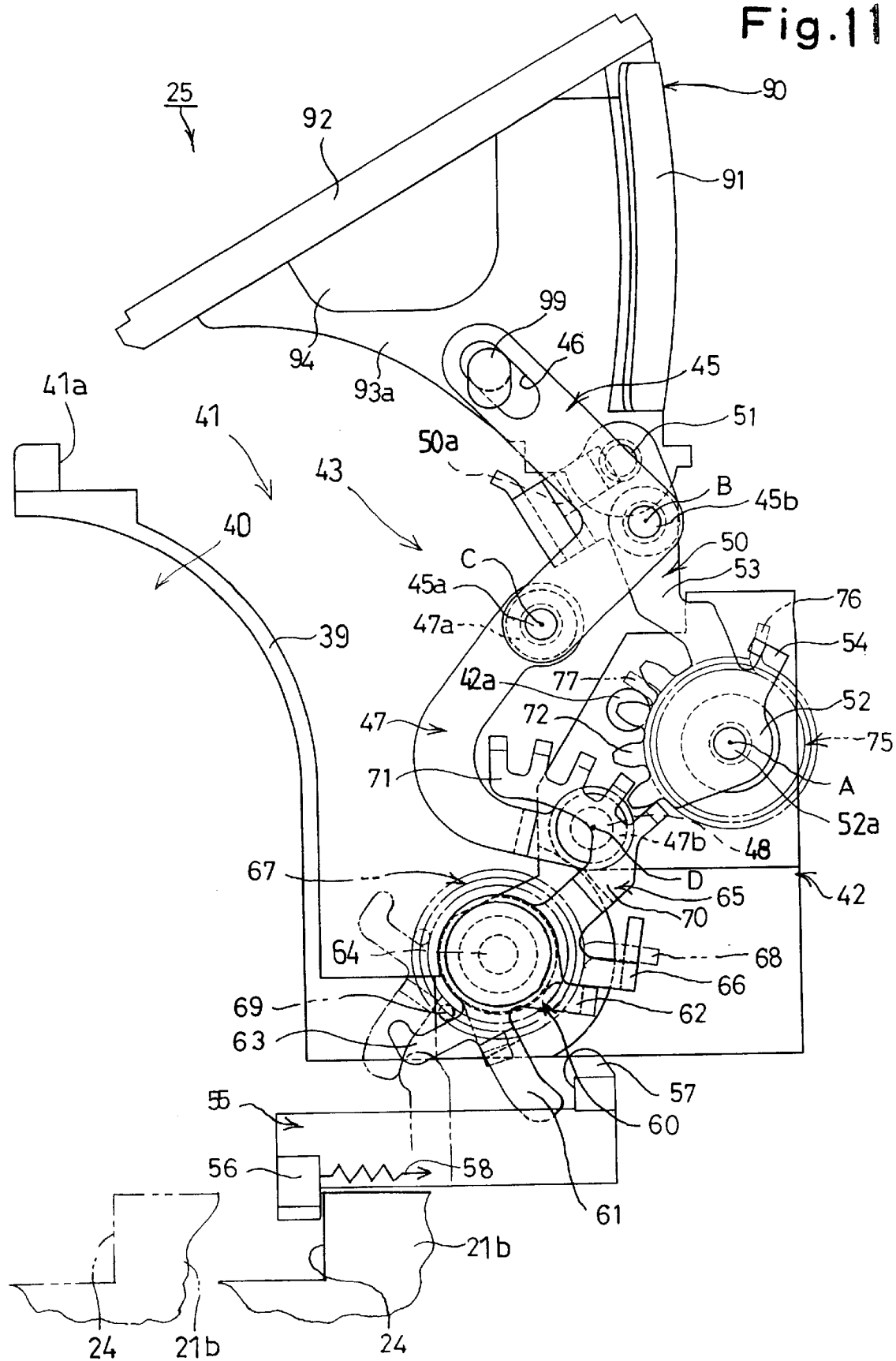
FIG. 11 is a side view of the retractable flash in an operable position shown in FIG. 2, seen from the left side as viewed in FIG. 2.
Figure 12:
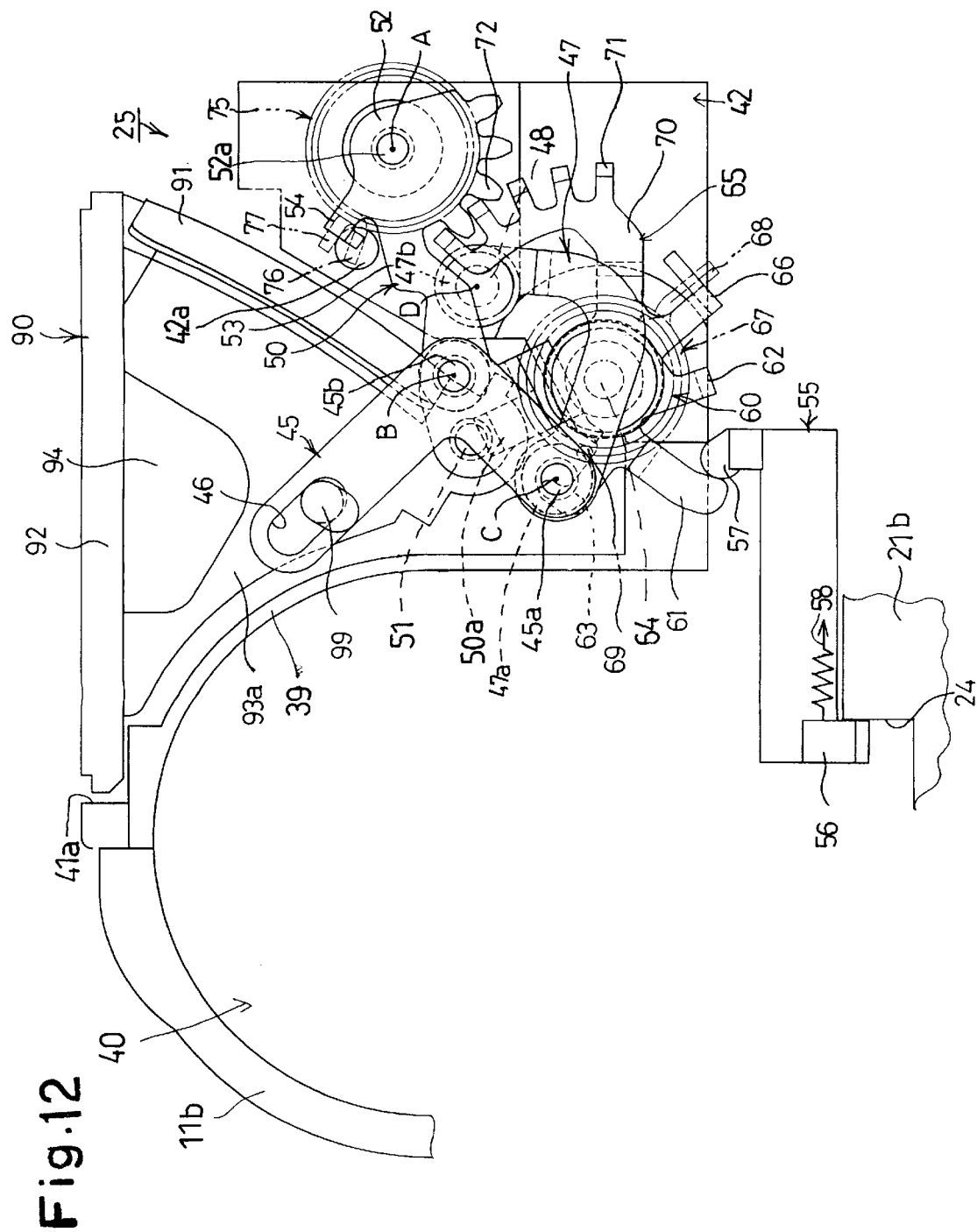
FIG. 12 is a side view of the retractable flash shown in FIG. 11 in a retracted position.

The outer barrel 21b of the zoom lens barrel 21 is provided on an outer peripheral surface thereof with a recess 24. There is provided a slidable member 55 which is adjacent to the outer barrel 21b in the vicinity of the recess 24. The slidable member 55 is guided in the direction of movement of the outer barrel 21b, i.e., in a direction parallel to the optical axis of the zoom lens barrel 21, and is continuously biased towards the front of the camera 11 (toward the right side as viewed in FIG. 11) by a spring 58. The rear end and the front end of the spring 58 are secured to the slidable member 55 and a member (not shown) fixed to the camera body 11, respectively. The slidable member 55 is provided at its rear end with a rear projection 56 which is positioned in the recess 24, so that the slidable member 55 is moved back to its rearmost position against the spring force of the spring 58 by the recess 24 when the outer barrel 21b is fully retracted into the camera body 11 as shown in FIG. 12, while the slidable member 55 advances to its frontmost position by the spring force of the spring 58 when the outer barrel 21b is slightly moved forwardly to its wide-angle photographing position shown in FIG. 11. Accordingly, the slidable member 55 moves back and forth when the outer barrel 21b is moved to the retracted position and wide-angle photographing position thereof, respectively. In FIG. 11 the outer barrel 21b in the wide-angle photographing position and in the retracted position is shown by solid line and two-dot chain line, respectively.

The slidable member 55 is provided at its front end with a front projection 57 which projects towards the supporting member 42. A rotatable member 60 is pivoted about a pivot 64 which is secured to one side (left side as viewed in FIG. 6) of the supporting member 42. The rotatable member 60 is provided with a first arm 61 which extends radially towards the slidable member 55 to be engaged with the front projection 57 of the slidable member 55. Therefore, the movement of the slidable member 55 from its frontmost position to its rearmost position causes the front projection 57 to contact the first arm 61 and subsequently move the same rearwardly to thereby rotate the rotatable member 60 in a clockwise direction as viewed in FIG. 11. The rotatable member 60 is further provided with a second arm 62 and a hook 63, each of which extends radially from the rotatable member 60. The tip of the second arm 62 is bent inwardly, to the right as viewed in FIG. 6.

There is provided a gear lever 65 pivoted about the pivot 64, coaxially to the rotatable member 60. The gear lever 65 is positioned above the rotatable member 60 in FIGS. 11 and 12. The gear lever 65 is provided with an arm portion 70 which extends radially from the pivoted end of the gear lever 65 and a first sector gear portion 71 connected to an free end of the arm portion 70. The gear lever 65 is further provided with a hook 66 whose end is bifurcated so that one end 68 of a second torsion coil spring 67 fitted on the pivot 64 is hooked on the bifurcated end. The other end 69 of the second torsion coil spring 67 is hooked on the hook 63 of the rotatable member 60. The coiled portion of the second torsion coil spring 67 is positioned between the supporting member 42 and the rotatable member 60. The rotatable member 60 and the gear lever 65 are continuously biased by the spring force of the second torsion coil spring 67 to rotate in opposite directions so that the second arm 62 and the hook 66 are engaged with each other. Each of the rotatable member 60 and the gear lever 65 can rotate in a direction to make the second arm 62 and the hook 66 disengage from each other against the spring force of the second torsion coil spring 67.

A gear plate 52 is integrally formed on one of the two primary levers 50 which is shown in FIG. 11. The gear plate 52 is provided along the circumference thereof with a second sector gear portion 72 which is in mesh with the first sector gear portion 71. Therefore, the rotation of the rotatable member 60 causes the two primary levers 50 to rotate through the first and second sector gear portions 71 and 72.

One of the two primary levers 50 which is shown in FIG. 11 is further provided on the gear plate 52 thereof with a projection 54. The supporting member 42 is provided with a fixed pin 42a in the vicinity of the gear plate 52. A first torsion coil spring 75 whose spring force is less than that of the second torsion coil spring 67 is fitted on the pivot 52a about which the primary lever 50 shown in FIG. 11 is pivoted. The coiled portion of the first torsion coil spring 75 is positioned between the supporting member 42 and the gear plate 52. One end 76 and the other end 77 of the first torsion coil spring 75 are engaged with the projection 54 and the fixed pin 42a, respectively, so that the primary lever 50 having the projection 54 thereon is rotated by the spring force of the first torsion coil spring 75 in a direction to raise the flashlight emitter block 90 to its popped-up position. Namely, the pair of linking mechanisms 43 are continuously biased by the first torsion coil spring 75 in a direction to raise the flashlight emitter block 90 to its popped-up position. When the pair of primary levers 50 together rotate in a counterclockwise direction as viewed in FIG. 11 to retract the flashlight emitter block 90 in the flash accommodation space 41, i.e., when the pair of primary levers 50 together rotate in a counterclockwise direction as viewed in FIG. 11 to be each positioned in a retracted position thereof shown in FIG. 12, the first torsion coil spring 75 is distorted to thereby charge the first torsion coil spring 75 with a spring force for raising the flashlight emitter block 90 to its popped-up position.

The amount of movement of the slidable member 55 between its frontmost position and rearmost position is predetermined to be a slightly larger than the amount of movement of the flashlight emitter block 90 between its retracted position and popped-up position. Namely, after the flashlight emitter block 90 has reached its retracted position from its popped-up position, the slidable member 55 is further retreated slightly, which makes the rotatable member 60 further rotate slightly in a clockwise direction as viewed in FIG. 12 with respect to the gear lever 65 against the spring force of the second torsion coil spring 67. This prevents play of the slidable member 55 from occurring when the slidable member 55 stays at its rearmost position.

The flash 25 having the aforementioned structures will operate in a manner hereinafter discussed. The pair of linking mechanisms 43 are the same as mentioned before, so that only the operation of one of the pair of linking mechanisms 43 which supports the side wall 93a (left side wall 93a as viewed in FIG. 11) will be hereinafter discussed. The pair of linking mechanisms 43 are linked with each other to move together. The rotational position of each primary lever 50 and the gear lever 65 at which the flashlight emitter block 90 is in the retracted position thereof is called a lowermost rotational position, while the rotational position of each primary lever 50 and the gear lever 65 at which the flashlight emitter block 90 is in its popped-up position is called an uppermost rotational position.

FIG. 12 shows the flash 25 when the primary slidable cover 15 is in the closed position thereof as shown in FIG. 1, namely, when the main switch of the camera 10 is OFF while the zoom lens barrel 21 is in its retracted position. In the state shown in FIG. 12, the slidable member 55 is held in the rearmost position thereof because the outer barrel 21b is fully retracted into the camera body 11, so that the front projection 57 of the slidable member 55 contacts the first arm 61 of the rotatable member 60 to push the same rearwardly towards the left as viewed in FIG. 12. In the state shown in FIG. 12, the gear lever 65, connected with the rotatable member 60 through the second torsion coil spring 67, is in the lowermost rotational position thereof while the first sector gear portion 71 is in mesh with the second sector gear portion 72 of the gear plate 52. Through these first and second gear portions 71 and 72 the primary lever 50 is held in its lowermost rotational position, so that the flashlight emitter block 90, which is supported by the primary lever 50 and the L-shaped lever 45, is held in its retracted position. In this state, the primary lever 50 is continuously biased by the spring force of the first torsion coil spring 75 to rotate in a clockwise direction as viewed in FIG. 12. At the same time, the slidable member 55 is held stably in its rearmost position without play because the second torsion coil spring 67 is slightly distorted to thereby bring the first arm 61 into pressing contact with the front projection 57 of the slidable member 55.

In this state shown in FIG. 12, manually sliding the primary sliding cover 15 from its closed position shown in FIG. 1 to its open position shown in FIG. 2 causes the main switch of the camera 11 to be turned ON, and at the same time the zoom motor is actuated to advance the zoom lens barrel 21 to its wide-angle photographing position. When the zoom lens barrel 21 (outer barrel 21b) advances, the rear projection 56 of the slidable member 55 is disengaged from the recess 24 of the outer barrel 21b, so that the slidable member 55 shifts forwardly by the spring force of the spring 58. This shifting of the slidable member 55 disengages the front projection 57 from the first arm 61 of the rotatable member 60, so that each rotatable member 60 and the gear lever 65 rotates in a counterclockwise direction as viewed in FIG. 12. This rotation of the gear lever 65 causes the primary lever 50 to swing up to its uppermost rotational position by the spring force of the first torsion coil spring 75. The slidable member 55 in its frontmost position shown in FIG. 11 is stably held due to the spring force of the spring 58.

As the primary lever 50 is swinging up towards its upright position, the pivot 51 of the flashlight emitter block 90 moves up in a path in the shape of an arc. At the same time, due to such movement of the primary lever 50, the L-shaped lever 45 is raised while slightly moving forwardly, so that the pin 99 of the flashlight emitter block 90 is together moving up through the engagement of the elongated hole 46 with the pin 99. Since the L-shaped lever 45 is connected to the supporting member 42 via the C-shaped lever 47, when the L-shaped lever 45 is raised, the C-shaped lever 47 rotates about the pivot 45a in the clockwise direction as viewed in FIG. 12 while maintaining the posture of the L-shaped lever 45. Consequently, the flashlight emitter block 90 is positioned in its popped-up position as shown in FIG. 11, with the flash lens 91 facing a photographic subject ahead of the camera 10.

As can be understood from the foregoing, the flashlight emitter block 90 is raised from its retracted position to its operable position by the spring force of the first torsion coil spring 75 and the flashlight emitter block 90 pops-up at the time the slidable member 55 moves forwardly from its rearmost position. The user of the camera 10 can freely select a desired flash mode by operating the select dial 17.

FIG. 11 shows the flash 25 when the primary slidable cover 15 is in the opened position thereof as shown in FIG. 2, namely, when the flashlight emitter block 90 is in its popped-up position with the zoom lens barrel 21 in its wide-angle photographing position. In this state shown in FIG. 11, manually sliding the primary slidable cover 15 slightly in a direction to close the same from its fully opened position causes the main switch of the camera 10 to be turned OFF, so that the zoom motor is actuated to fully retract the zoom lens barrel 21 (outer and lower barrels 21a and 21b) into the camera body 11. At the same time the slidable member 55 is moved rearwardly to its rearmost position by the retreat of the outer barrel 21b. This rearward movement of the slidable member 55 causes the rotatable member 60 to rotate in the clockwise direction as viewed in FIG. 11, which makes the gear lever 65 rotate in the same direction at the same time. This rotation of the gear lever 65 causes the primary lever 50 to rotate in the counterclockwise direction as viewed in FIG. 11 while distorting the first torsion coil spring 75. At this stage the second torsion coil spring 67 is not distorted because the spring force of the first torsion coil spring 75 is less than that of the second torsion coil spring 67 as mentioned before, so that the rotatable member 60 and the gear lever 65 rotate together. Accordingly, the pair of linking mechanisms 43 operate adversely to the case when the flashlight emitter block 90 is raised to its popped-up position. When the primary lever 50 swings down to its lowermost rotational position, the L-shaped lever 45 moves down to be positioned in the flash accommodation space 41. While the L-shaped lever 45 is moving down, the lower end of the L-shaped lever 45 pushes the end 47a of the C-shaped lever 47 down through the pivot 45a, which makes the C-shaped lever 47 rotate in a counterclockwise direction as viewed in FIG. 11 to thereby determine the lowermost position of the L-shaped lever 45.

When the zoom lens barrel 21 is fully retracted, the pair of linking mechanisms 43 fall into the state shown in FIG. 12. Namely, when the zoom lens barrel 21 is fully retracted, the flashlight emitter block 90 is retracted into the camera body 11 with the upper surface of the roof wall 92 being substantially flush with the upper surface of the camera body 11. In this state, the first torsion coil spring 75 is distorted to thereby have completed charging the first torsion coil spring 75 with a spring force to raise the flashlight emitter block 90 to its popped-up position.

The zoom lens barrel 21 further retreats by a little amount after the flashlight emitter block 90 has retracted to reach its retracted position. Therefore, the rotatable member 60 rotates by an amount greater than the amount of rotation of the gear lever 65 in a direction to move the second arm 62 apart from the hook 66 of the gear lever 65. This causes the second torsion coil spring 67 to be distorted, so that the slidable member 55 is held in its rearmost position without play.

Normally, when the zoom lens barrel 21 is retracted, the second torsion coil spring 67 is distorted to thereby hold the slidable member 55 stably in its rearmost position after the flashlight emitter block 90 has retracted in the flash accommodation space 41. However, in the case where the flashlight emitter block 90 is prevented from smoothly retracting in the flash accommodation space 41 due to a condition that, e.g., something is stuck between the flashlight emitter block 90 and the camera body 11 or the flashlight emitter block 90 is intentionally forcibly depressed while the zoom lens barrel 21 is retreating, the second torsion coil spring 67 is distorted at the time of such an interruption to allow the gear lever 65 and the rotatable member 60 to rotate relative to each other. Therefore, when such an interruption occurs, the rotatable member 60 is rotated by the rearward movement of the outer barrel 21b while the gear lever 65 is not rotated by the rotation of the rotatable member 60. Accordingly, with the second torsion coil spring 67 the pair of linking mechanisms 43 is prevented from being damaged due to such an interruption.

The flash 25 is further provided inside the supporting member 42 with a switch 80 (see FIG. 6) for detecting whether or not the flashlight emitter block 90 is in its popped-up position. The detecting switch 80 is provided with a pair of upper and lower contact springs 81 and 82. Fixed ends of the contact springs 81 and 82 are apart from each other with a mounting base pin 83 being positioned therebetween. The mounting base pin 83 is secured to the supporting member 42. In a free state respective free ends of the contact springs 81 are apart from each other. The lower contact spring 82 is longer than the upper contact spring 81 and is provided at the free end thereof with an engaging member 84. The tip of this engaging member 84 is positioned outside the supporting member 42 to be engageable with an engaging portion 50c (see FIGS. 7 through 10) radially projecting from the right primary lever 50 as viewed in FIG. 6. When the flashlight emitter block 90 moves from its retracted position to popped-up position, the engaging portion 50c firstly contacts the engaging member 84 and subsequently raise the same against the spring force of the lower contact spring 82 to thereby bring the lower contact spring 82 into contact with the upper contact spring 81. Thereafter, when the flashlight emitter block 90 moves from its popped-up position to retracted position, the engaging portion 50c moves apart from the engaging member 84 to thereby disengage the lower contact spring 82 from the upper contact spring 81.

The camera 10 is provided inside the supporting member 42 with a flashlight control circuit (not shown). The upper and lower contact springs 81 and 82 are electrically connected to the flashlight control circuit. Accordingly, the flashlight control circuit judges whether or not the flashlight emitter block 90 is in its popped-up position by knowing an ON/OFF state of the detecting switch 80. Any electrical parts such as a condenser or a transducer may be arranged inside the supporting member 42.

It can be understood from the foregoing that the flashlight emitter block 90 is automatically raised and retracted when the main switch of the camera 10 is turned ON and OFF, respectively, so that the user of the camera 10 is free from a conventional operation of manually raising and retracting the retractable flash. This effectively prevents the flash 25 from being mistakenly raised or retracted contrary to the need of the user. According to the present embodiment of the camera 10, the flashlight emitter block 90 is raised and retracted through the slidable gear 55, associated with the zoom lens barrel 21 to be moved by the movement thereof, and the pair of linking mechanisms 43, comprised of some rotatable levers and gears, which is simple in structure. Furthermore, owing to the second torsion coil spring 67 the flash 25 is effectively prevented from being damaged when the movement of the flashlight emitter block 90 is interrupted by an external factor.

According to the structure of the flash 25, the flashlight emitter block 90 is highly raised from the camera body 11 using the pair of linking mechanism 43, the red-eye phenomenon is effectively prevented from occurring and also flashlight is effectively prevented from being interrupted by the tip of the zoom lens barrel 21, especially when the zoom lens barrel 21 is fully extended.

It can be said that the flashlight emitter block 90 is space-efficiently accommodated in the flash accommodation space 41 in the present embodiment of the camera 10. The flashlight emitter block 90 has a substantially triangular cross sectional shape as can be clearly seen from FIG. 8, and a space in which the supporting member 42 is positioned can be secured in front of the flash accommodation space 41 owing to the shape and posture of the flashlight emitter block 90 in its retracted position. Accordingly, the space secured in front of the flash accommodation space 41 is effectively utilized in the present embodiment of the camera 10.

Furthermore, in the present embodiment of the camera 10, the battery chamber 40 is space-efficiently formed in the camera body 11 immediately behind the flash accommodation space 41, without making a large gap between the flash accommodation space 41 and the battery chamber 40. This space-efficient structure has been realized by forming the bottom wall 90a of the flashlight emitter block 90 as a curved wall which corresponds to and is adjacent to the curved wall 39, which forms a part of the cylindrical wall forming the battery chamber 40. Therefore, it can be appreciated that the supporting member 42, the flashlight emitter block 90 and the battery chamber 40 are space-efficiently formed and arranged above the spool chamber 23 in the camera body 11. Moreover, the battery in the battery chamber 40 can be electrically connected to the flashlight control circuit positioned in the supporting member 42 in an easy and simple manner because the battery chamber 40 and the supporting member 42 are positioned closely to each other in the camera body 11.

Figure 13:
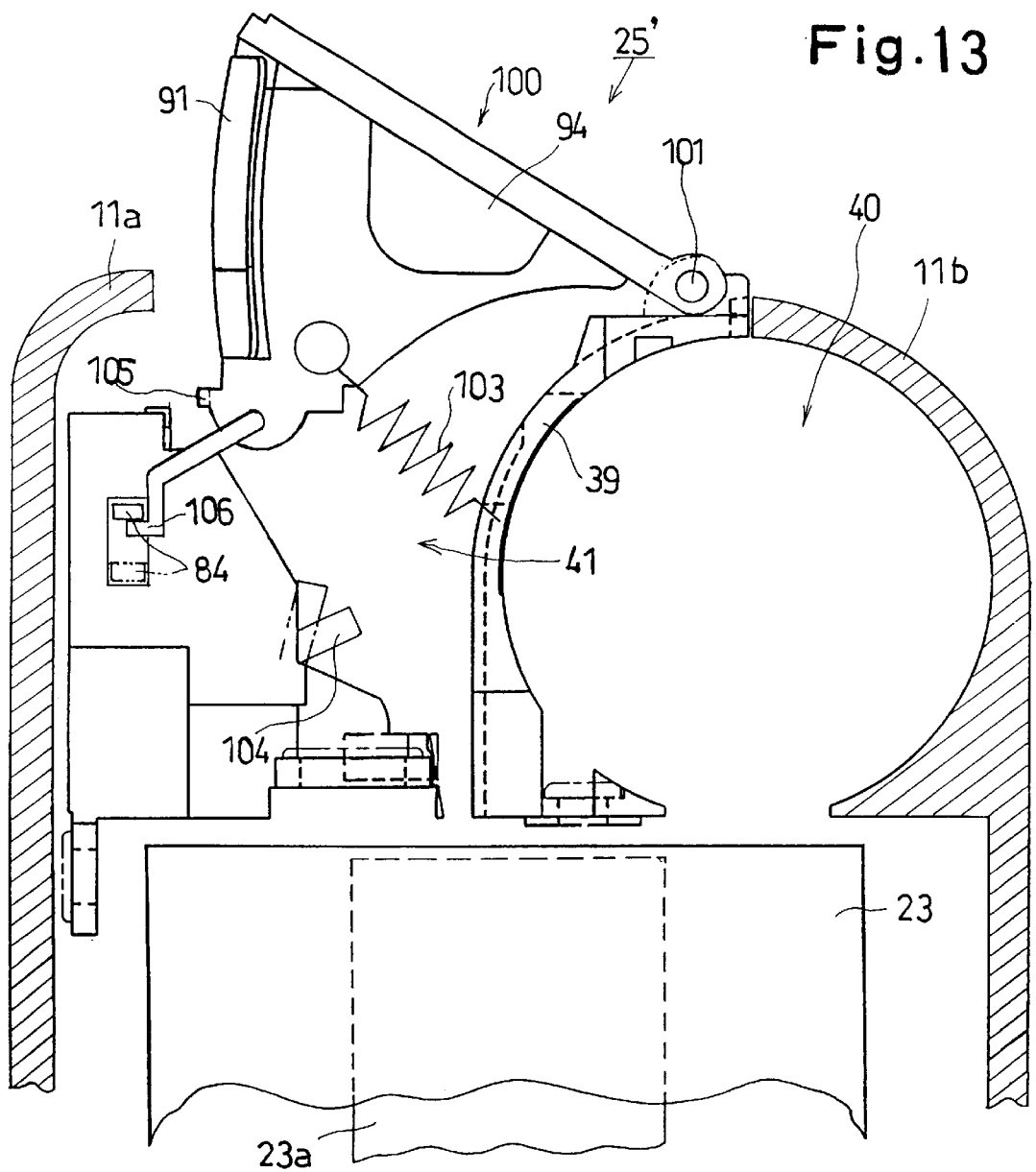
FIG. 13 is a cross sectional view, which corresponds to the cross sectional view of FIG. 7, showing a second embodiment of the built-in retractable flash of the camera shown in FIG. 1 in an operable position.

FIG. 13 shows a second embodiment of the retractable flash provided in the camera 10. In this second embodiment of the retractable flash 25', neither mechanisms corresponding to the pair of linking mechanisms 43 nor a member corresponding to the slidable member 55 which associates the zoom lens barrel 21 with the flash are provided. The second embodiment of the retractable flash 25' is identical to the first embodiment of the flash 25 in many respects, so that only the elements or parts different from those in the first embodiment of the flash 25 will be hereinafter discussed.

The flashlight emitter block 100 is identical to the flashlight emitter block 90 except for the way of connecting the flashlight emitter block to the camera body 11. The flashlight emitter block 100 is pivoted at a pivotal shaft 101 which is secured to an upper portion of the camera body 11 to extend in the widthwise direction of the camera body 11. One end of the spring 103 is fixed to the flashlight emitter block and the other end of the spring 103 is fixed to the curved wall 39 of the camera body 11. The flashlight emitter block 100 is continuously biased by the spring 103 in a direction to be raised towards its popped-up position, away from the flash accommodation space 41. Therefore, when the user of the camera 10 desires to retract the flashlight emitter block 100 into the camera body 11, he or she depresses the flashlight emitter block 100 manually to retract the same into the flash accommodation space 41. When the flashlight emitter block 100 is manually retracted in such a manner, the spring 103 is compressed and a projection 105 formed on a front lower end of the flashlight emitter block 100 is engaged with a stopper 104 provided in the flash accommodation space 41 to hold the flashlight emitter block 100 in the flash accommodation space 41. In this state, manually operating a knob or button (not shown) provided on the camera body 11 causes the stopper 104 to move from an initial position (shown by solid line in FIG. 13) to a release position (shown by two-dot chain line in FIG. 13) to thereby disengage the projection 105 from the stopper 104. At the moment the projection 105 is disengaged from the stopper 104, the flashlight emitter block 100 is popped- up by the spring force of the spring 103. The flashlight emitter block 100 is provided with an operation arm 106 whose tip is engageable with the engaging member 84 of the detecting switch 80. Therefore, when the flashlight emitter block 100 moves from its retracted position to popped-up position, the tip of the operation arm 106 firstly contacts the engaging member 84 and subsequently lifts the same against the spring force of the lower contact spring 82 to thereby bring the lower contact spring 82 into contact with the upper contact spring 81. The structure of this second embodiment of the flash 25' is very simple as compared with that of the first embodiment of the flash 25 because neither mechanisms corresponding to the pair of linking mechanisms 43 nor a member corresponding to the slidable member 55 which associates the zoom lens barrel 21 with the flash are provided. Due to the camera 10 being provided with this second embodiment of the flash 25', the supporting member 42, the flashlight emitter block 100 and the battery chamber 40 are space-efficiently formed above the spool chamber 23 in the camera body 11, similarly to the camera having the first embodiment of the flash 25. Moreover, the battery cell in the battery chamber 40 can be electrically connected to the flashlight control circuit positioned in the supporting member 42 in an easy and simple manner because the battery chamber 40 and the supporting member 42 are positioned closely to each other in the camera body 11, similarly to the camera having the first embodiment of the flash 25.

Figure 14:
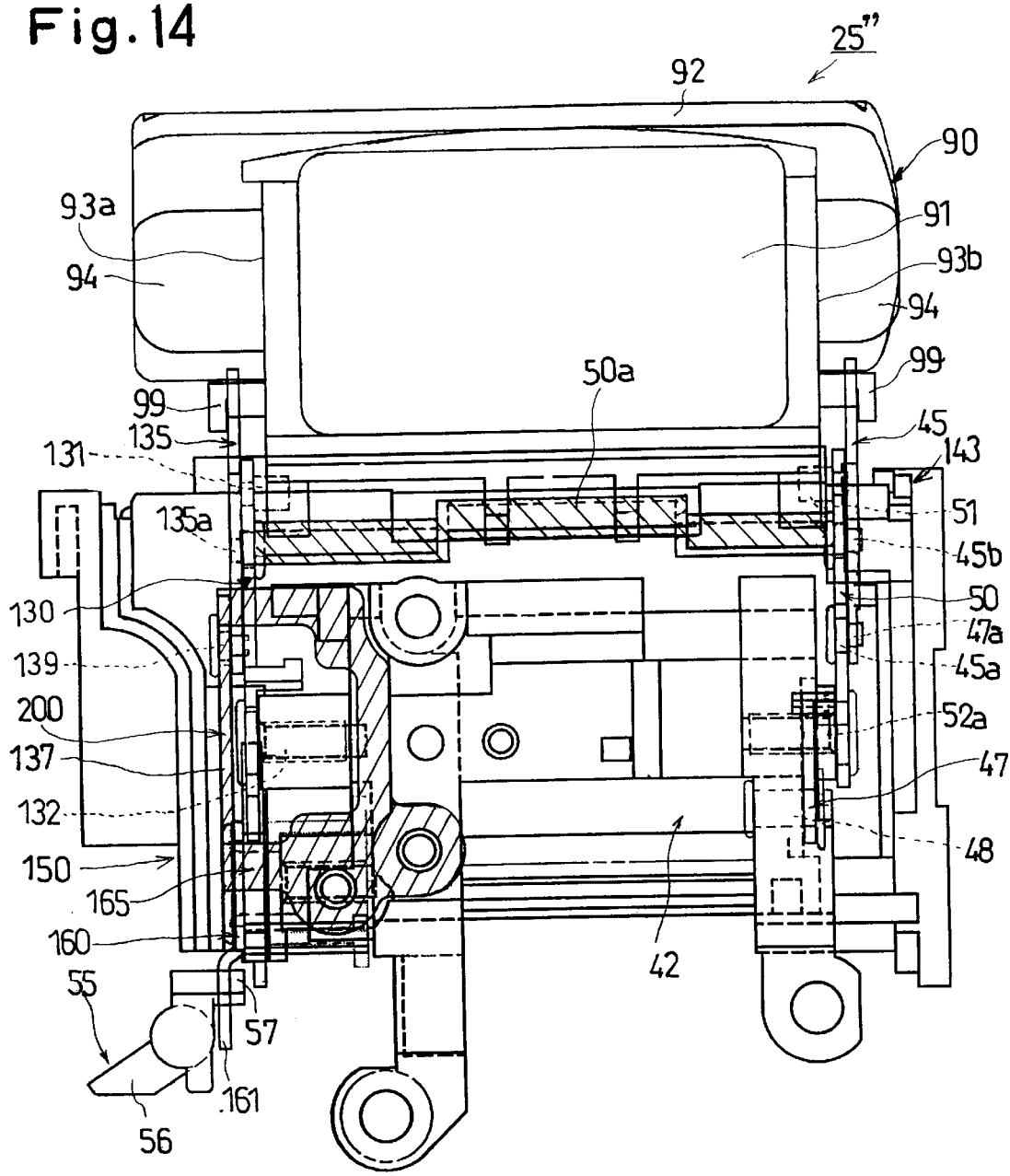
FIG. 14 is a front view of a third embodiment of the built-in retractable flash of the camera shown in FIG. 1 in an operable position.
Figure 15:
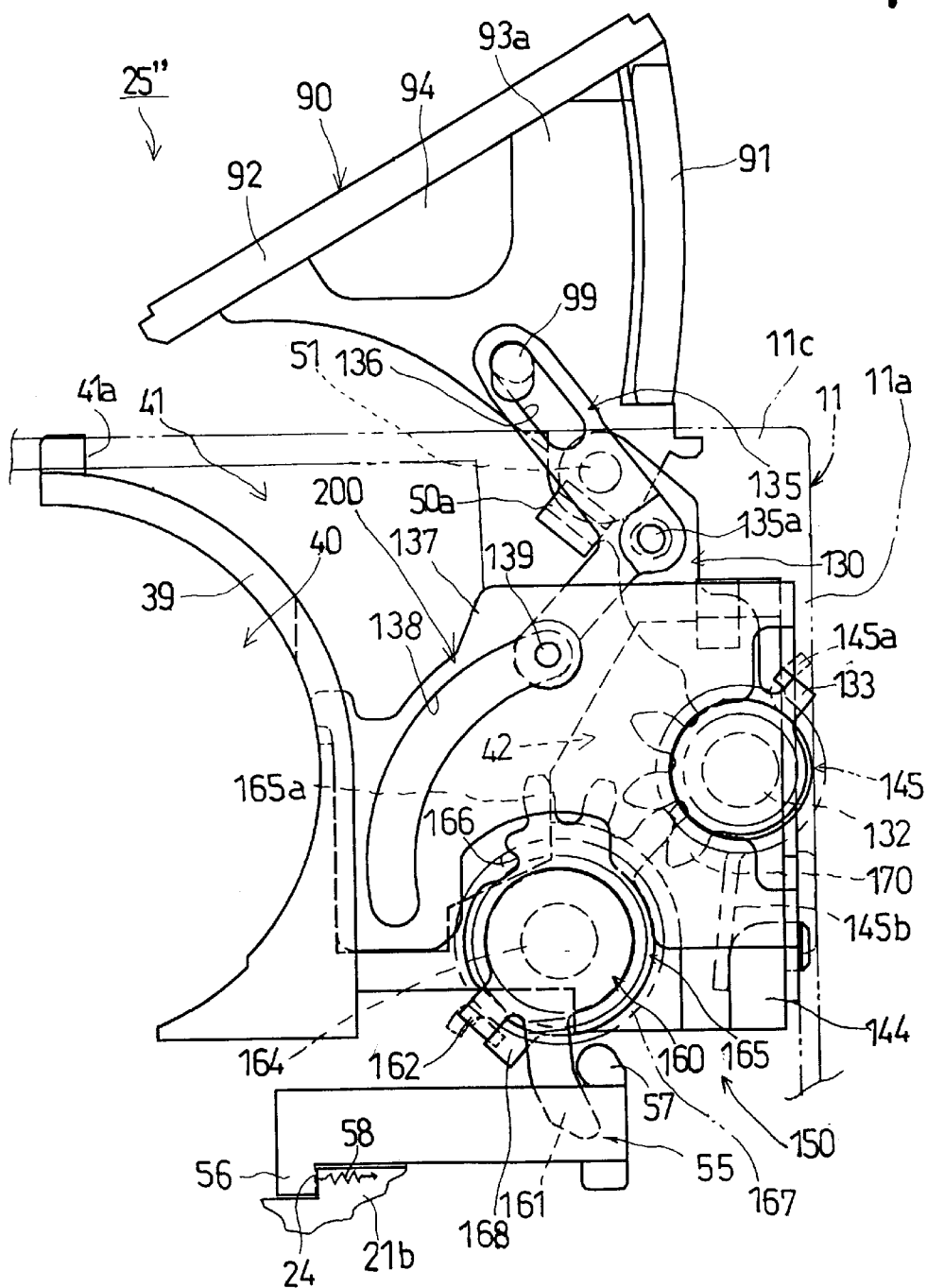
FIG. 15 is a side view of the retractable flash shown in FIG. 14, seen from the left side as viewed in FIG. 14.
Figure 16:
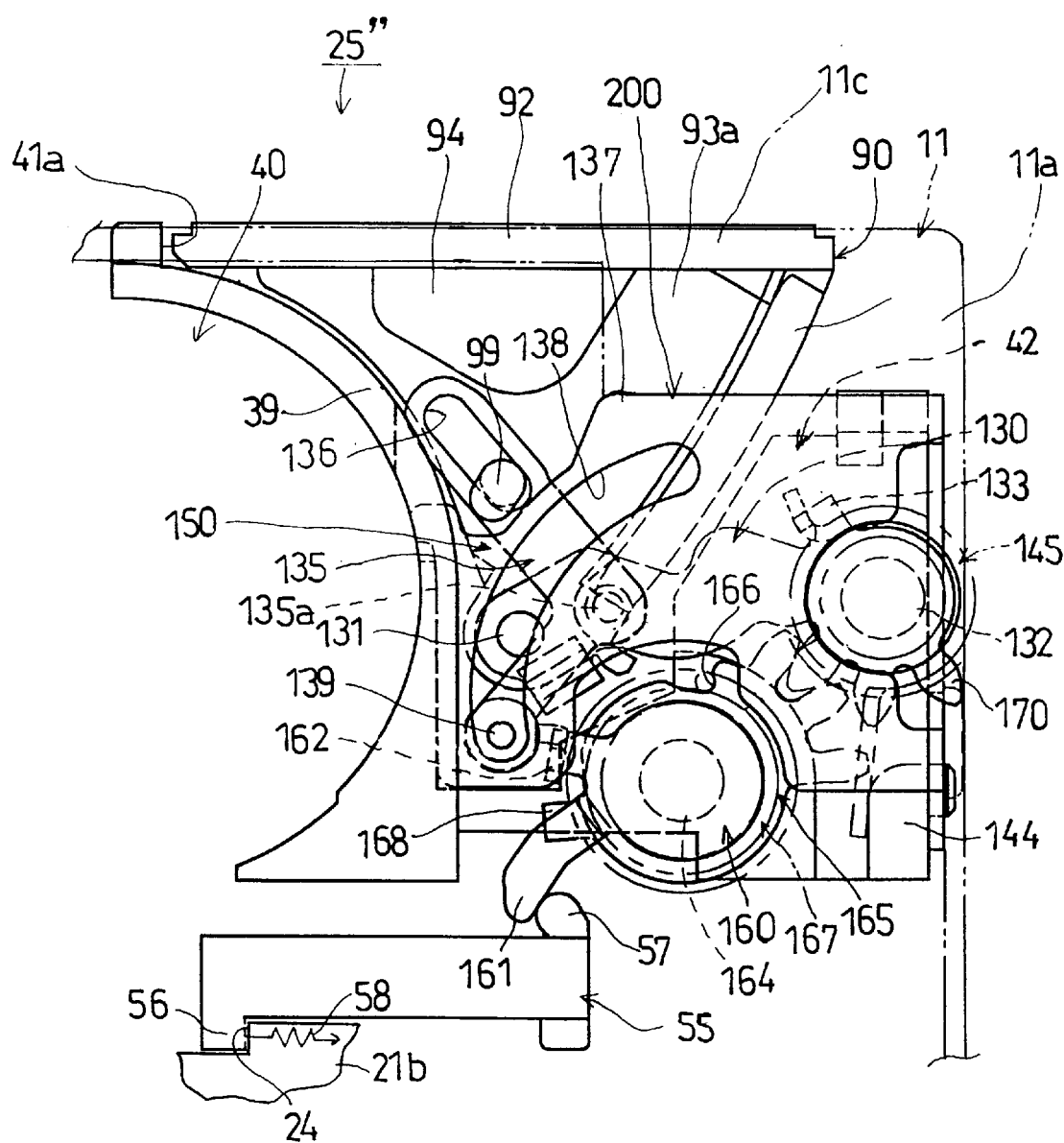
FIG. 16 is a side view of the retractable flash shown in FIG. 14 in a retracted position.

FIGS. 14 through 16 show a third embodiment of the retractable flash provided in the camera 10. This third embodiment of the retractable flash 25" is identical to the first embodiment of the flash 25 in many respects, so that only the elements or parts different from those in the first embodiment will be hereinafter discussed.

Figure 6:
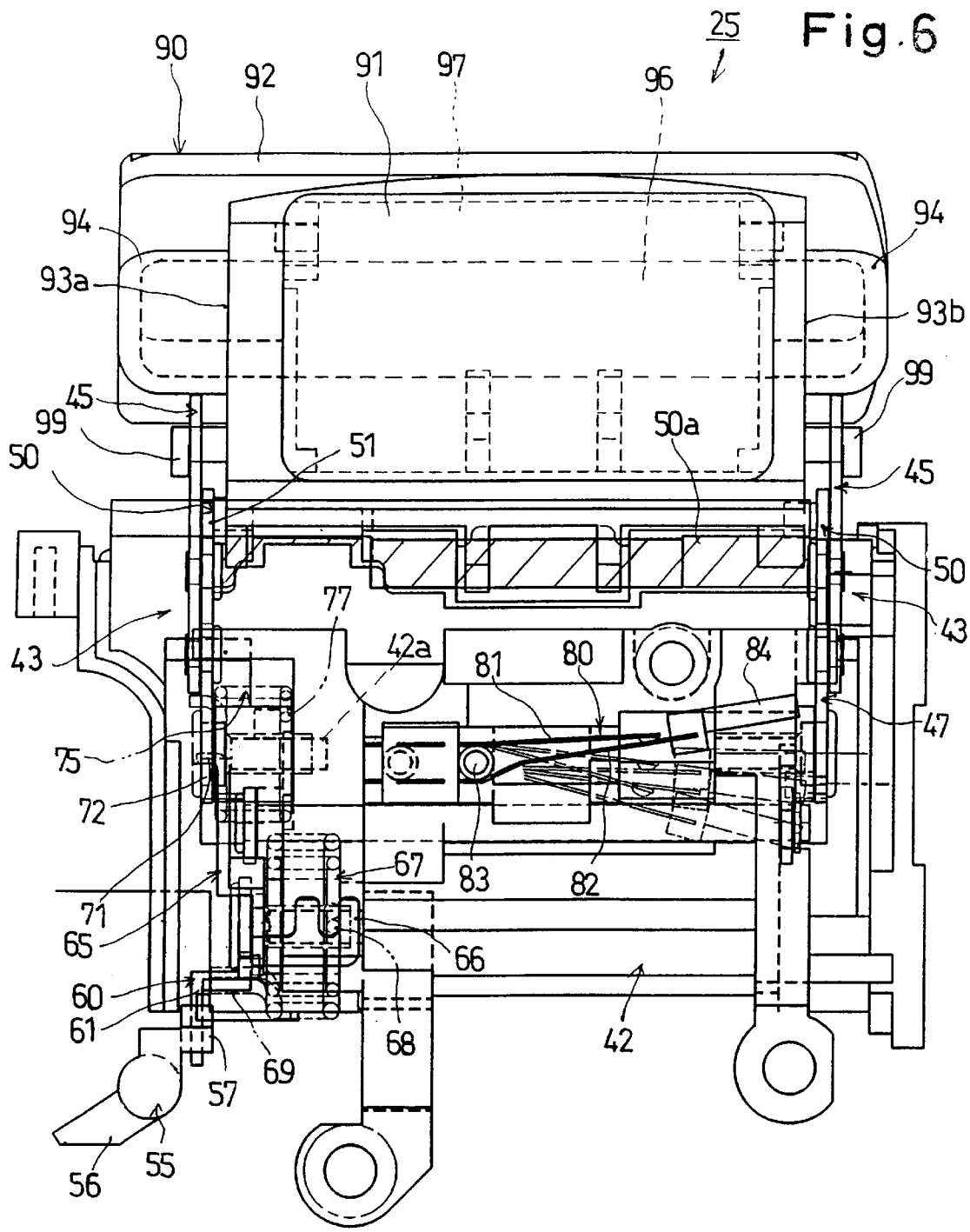
FIG. 6 is a front view of a first embodiment of the retractable flash shown in FIG. 1 in an operable position.

A linking mechanism 143 which supports the right side wall 93b of the flashlight emitter block 90 as viewed in FIG. 14 is identical to the right linking mechanism 43 of the first embodiment of the flash 25 as viewed in FIG. 6. The difference between the flash 25 of the first embodiment and the flash 25" of the third embodiment lies in that the other linking mechanism 150 which supports the left side wall 93a of the flashlight emitter block 90 as viewed in FIG. 14 is different from the left linking mechanism 43 of the first embodiment of the flash 25 as viewed in FIG. 6.

The linking mechanism 150 supports the side wall 93a and is composed of a primary lever 130, an L-shaped lever 135 and a cam plate 137. The primary lever 130 is similar to the primary lever 50 shown in FIG. 11. One end of the primary lever 130 is pivoted about a pivot 132 projected from the supporting member 42 to be coaxial to the pivot 52a provided on the opposite side of the supporting member 42. The other end of the primary lever 130 is pivoted about the pin 51 formed on the side wall 93a.

The L-shaped lever 135, similar to the L-shaped lever 45 of the first embodiment shown in FIG. 11, is provided at one end (upper end) thereof with an elongated hole 136 in which the pin 99 formed on the side wall 93a is slidably positioned. The primary lever 130 is provided in the vicinity of the pivot 51 thereof with a pivot 135a about which a bent portion of the L-shaped lever 135 is pivoted. The other end (lower end) of the L-shaped lever 135 is provided with a follower pin 139 which is slidably fitted in a cam slot or groove 138 formed on the cam plate 137.

The cam plate 137 is integrally formed with a cam member 200 secured to the curved wall 39, the front wall 11a and an upper wall 11c of the camera body 11. In FIG. 14 the cam member 200 is shown with diagonal section lines. The cam plate 137 is positioned at the left end of the cam member 200 as viewed in FIG. 14 to extend parallel to the side wall 93a of the flashlight emitter block 90. The cam plate 137 is provided with the aforementioned cam slot 138 in which the follower pin 139 of the L-shaped lever 135 is slidably fitted. The cam slot 138 is formed in the shape of an arc as can be seen from FIG. 15 or 16. The primary lever 130 and the L-shaped lever 135 move together similar to the primary lever 50 and the L-shaped lever 45. When the L-shaped lever 135 is moved by the movement of the primary lever 130, the follower pin 139 of the L-shaped lever 135 moves along the cam slot 138. Accordingly, the cam slot 138 has a function similar to that of the C-shaped lever 47 of the linking mechanism 43. Therefore, according to the third embodiment of the flash 25", the flashlight emitter block 90 is raised and retracted when the primary levers 50 and 130 together swing up and down, respectively, similarly to the first embodiment of the flash 25.

The primary levers 50 and 130 are connected to each other by a connecting bar 50a (shown by diagonal section lines in FIG. 14) so as to swing together. During this swinging movement of the pair of primary levers 50 and 130, the position and posture of the flashlight emitter block 90 are controlled by the pair of L-shaped levers 45 and 135, the C-shaped lever 47 and the cam slot 138. Accordingly, the flashlight emitter block 90 is moved up and down through the pair of linking mechanisms 143 and 150 between the popped-up position or operable position (the position shown in FIG. 15) and the retracted position (the position shown in FIG. 16) with the upper surface of the roof wall 92 of the flashlight emitter block 90 being substantially flush with the upper surface of the camera body 11.

Since the cam member 200 having the cam plate 137 is secured to the camera body 11 as mentioned above, the cam plate 137 is firmly supported by the camera body 11, so that the flashlight emitter block 90 is stably and securely supported on the camera body 11 through the cam plate 137. The reason why the cam member 200 having the cam plate 137 is provided on the side of the side wall 93a (on the left side as viewed in FIG. 14), not on the side of the side wall 93b (on the right side as viewed in FIG. 14), is because a strong impact could possibly be applied to the cam member 200 from the outside the camera, especially from the right side as viewed in FIG. 14, if the camera is accidentally dropped onto the ground, so that it is effective to have the cam member 200 on the left side as viewed in FIG. 14 to enhance the strength of the flash 25". Furthermore, having the cam member 200 on the left side as viewed in FIG. 14 is effective in preventing the red-eye phenomenon from occurring. This is because the cam member 200 has a thickness larger than that of the linking mechanism 143 and it is therefore preferable to position the cam member 200 on the left side as viewed in FIG. 14 to position the flashlight emitter block 90 away from the photographic optical axis as far as possible in order to prevent the red-eye phenomenon from occurring. It is also preferable that the linking mechanism 143, whose structure is more complicated than that of the linking mechanism 150, should be positioned on the right side as viewed in FIG. 14 so as be easily assembled from the outside the camera body 11.

A first torsion coil spring 145 is fitted on the pivot 132, about which the primary lever 130 is pivoted. One end 145a and the other end 145b of the first torsion coil spring 145 are engaged with a projection 133 integrally formed on the pivoted end of the primary lever 130 and an engaging portion 144 integrally formed on the supporting member 42, respectively, so that the primary lever 130 is continuously biased by the first torsion coil spring 145 to rotate in a clockwise direction as viewed in FIG. 15 to raise the flashlight emitter block 90 to its popped-up position thereof. Namely, the pair of linking mechanisms 143 and 150 are continuously biased by the first torsion coil spring 145 in a direction to raise the flashlight emitter block 90 to its popped-up position. When the primary lever 130 rotates in a counterclockwise direction as viewed in FIG. 15 to retract the flashlight emitter block 90 in the flash accommodation space 41, the first torsion coil spring 145 is distorted to thereby charge the first torsion coil spring 145 with a spring force for raising the flashlight emitter block 90 to its popped-up position.

The linking mechanism 150 together with the linking mechanism 143 operates to raise or retract the flashlight emitter block 90 by receiving the movement of the zoom lens barrel 21 in the optical axis direction, in a manner similar to the pair of linking mechanism 43 of the first embodiment of the flash 25.

A rotatable member 160, similar to the rotatable member 60 of the first embodiment of the flash 25, is pivoted about a pivot 164 which is secured to one side (left side as viewed in FIG. 14) of the supporting member 42. The rotatable member 160 is provided with a first arm 161 which extends radially towards the slidable member 55 to be engaged with the front projection 57 of the slidable member 55. Therefore, the movement of the slidable member 55 from its frontmost position to its rearmost position causes the front projection 57 to contact the first arm 161 and subsequently move the same rearwardly to thereby rotate the rotatable member 160 in a clockwise direction as viewed in FIG. 15. The rotatable member 160 is further provided with a second arm 162 which extends radially from the rotatable member 160. The tip of the second arm 162 is bent inwardly, to the right as viewed in FIG. 14.

There is provided a gear member 165 pivoted about the pivot 164, coaxially to the rotatable member 160. The gear member 165 is provided on an peripheral edge thereof with a first sector gear portion 165a. The gear member 165 is further provided with a recessed hook portion 166 and an engaging projection 168. One end and the other end of a second torsion coil spring 167 fitted on the pivot 164 are respectively engaged with the recessed hook portion 166 and the second arm 162. The spring force of the second torsion coil spring 167 is greater than that of the first torsion spring 145. The rotatable member 160 and the gear member 165 are continuously biased by the spring force of the second torsion coil spring 167 to rotate in opposite directions so that the second arm 162 and the engaging projection 168 are engaged with each other. The rotatable member 160 and the gear member 165 can rotate in a direction to make the second arm 162 and the engaging projection 168 disengage from each other against the spring force of the second torsion coil spring 167.

The primary lever 130 is provided around the pivoted end thereof with a second sector gear portion 170 which is in mesh with the first sector gear portion 165a of the gear member 165. Therefore, the rotation of the rotatable member 160 causes the primary lever 130 to rotate through the first and second sector gear portions 165a and 170.

The flash 25" having the aforementioned structures will operate in a manner hereinafter discussed. The linking mechanism 143 of this third embodiment of the flash 25" is the same as the corresponding linking mechanism 43 of the first embodiment of the flash 25 as mentioned before, so that only the operation of the linking mechanism 150, which supports the side wall 93a (left side wall 93a as viewed in FIG. 14), will be hereinafter discussed.

FIG. 16 shows the flash 25" when the main switch of the camera 10 is OFF while the zoom lens barrel 21 is in its retracted position. In the state shown in FIG. 16, the slidable member 55 is held in the rearmost position thereof because the outer barrel 21b is fully retracted into the camera body 11, so that the front projection 57 of the slidable member 55 contacts the first arm 161 of the rotatable member 160 to push the same rearwardly to the left as viewed in FIG. 16. In the state shown in FIG. 16, through the rotatable member 160, the gear member 165 and the first and second gear portions 165a and 170, the primary lever 130 is held in its lowermost rotational position, so that the flashlight emitter block 90, which is supported by the primary lever 130 and the L-shaped lever 135, is held in its retracted position. In this state, the primary lever 130 is continuously biased by the spring force of the first torsion coil spring 145 to rotate in a clockwise direction as viewed in FIG. 16, while the follower pin 139 of the L-shaped lever 135 contacts the lower end of the cam slot 138.

In this state shown in FIG. 16, when the main switch of the camera 11 is turned ON, the zoom motor is actuated to advance the zoom lens barrel 21 to its wide-angle photographing position. When the zoom lens barrel 21 (outer barrel 21b) advances, the rear projection 56 is disengaged from the recess 24 of the outer barrel 21b, so that the slidable member 55 shifts forwardly by the spring force of the spring 58. This shifting of the slidable member 55 disengages the front projection 57 from the first arm 161 of the rotatable member 160, so that each of the rotatable member 160 and the gear member 165 rotates in a counterclockwise direction as viewed in FIG. 16. This rotation of the gear member 165 causes the primary lever 130 to swing up to its uppermost rotational position by the spring force of the first torsion coil spring 145.

While the primary lever 130 is swinging up towards its upright position, the pivot 51 of the flashlight emitter block 90 is together moving up in a path in the shape of a circular arc. At the same time, due to such a movement of the primary lever 130, the L-shaped lever 135 is raised while slightly moving forwardly, so that the pin 99 of the flashlight emitter block 90 moves up through the engagement of the elongated hole 136 with the pin 99. Since the L-shaped lever 135 is connected to the supporting member 42 via the cam plate 137, when the L-shaped lever 135 is raised, the follower pin 139 of the L-shaped lever 135 contacts the upper end of the cam slot 138. The linking mechanism 143 operates together with the linking mechanism 150. Consequently, the flashlight emitter block 90 is positioned in its popped-up position as shown in FIG. 15, with the flash lens 91 facing a photographic subject ahead of the camera 10.

FIG. 15 shows the flash 25" when the primary slidable cover 15 is in its opened position as shown in FIG. 2, namely, when the flashlight emitter block 90 is in its popped-up position with the zoom lens barrel 21 in its wide-angle photographing position. In this state shown in FIG. 15, when the main switch of the camera 10 is turned OFF, the zoom motor is actuated to fully retract the zoom lens barrel 21 into the camera body 11. At the same time the slidable member 55 is moved rearwardly to its rearmost position by the retreat of the outer barrel 21b. This rearward movement of the slidable member 55 causes the rotatable member 160 to rotate in the clockwise direction as viewed in FIG. 15, which makes the gear member 165 rotate in the same direction at the same time. This rotation of the gear member 165 causes the primary lever 130 to rotate in the counterclockwise direction as viewed in FIG. 15 while distorting the first torsion coil spring 145. At this stage the second torsion coil spring 167 is not distorted because the spring force of the second torsion coil spring 167 is greater than that of the first torsion coil spring 145 as mentioned before, so that the rotatable member 160 and the gear member 165 rotate together. Accordingly, the pair of linking mechanism 143 and 150 operate adversely to the case when the flashlight emitter block 90 is raised to its popped-up position. When the primary lever 130 swings down to its lowermost rotational position, the L-shaped lever 135 moves down to be positioned in the flash accommodation space 41. While the L-shaped lever 135 is moving down, the follower pin 139 of the L-shaped lever 135 moves down along the cam slot 138 to contact the lower end of the cam slot 138, so that the pair of linking mechanisms 143 and 150 fall into the state shown in FIG. 16. Namely, when the zoom lens barrel 21 is fully retracted, the flashlight emitter block 90 is retracted into the camera body 11 with the upper surface of the roof wall 92 being substantially flush with the upper surface of the camera body 11. In this state, the first torsion coil spring 145 is distorted to thereby have completed charging the first torsion coil spring 145 with a spring force for raising the flashlight emitter block 90 to its popped-up position.

The zoom lens barrel 21 further retreats a bit after the flashlight emitter block 90 has retracted to reach its retracted position. Therefore, the rotatable member 160 rotates by an amount greater than the amount of rotation of the gear member 165 in a direction to move the second arm 162 apart from the engaging projection 168 of the gear member 165. This causes the second torsion coil spring 167 to be distorted, so that the slidable member 55 is held in its rearmost position without play. In the case where the flashlight emitter block 90 is prevented from smoothly retracting in the flash accommodation space 41 due to a condition that, e.g., something is stuck between the flashlight emitter block 90 and camera body 11 or the flashlight emitter block 90 is intentionally forcibly depressed while the zoom lens barrel 21 is retreating, the second torsion coil spring 167 is distorted at the time of such an interruption to allow the gear member 165 and the rotatable member 160 to rotate relative to each other. Therefore, when such an interruption occurs, the rotatable member 160 is rotated by the rearward movement of the outer barrel 21b while the gear member 165 is not rotated by the rotation of the rotatable member 160. Accordingly, with the second torsion coil spring 167 the pair of linking mechanisms 143 and 150 are prevented from being damaged due to such an interruption as mentioned above, in a similar manner to that of the first embodiment of the flash 25.

As can be understood from the foregoing, according to the third embodiment of the flash 25", one side end of the flashlight emitter block 90 is supported by the linking mechanism 150 having the cam member 200 provided with the cam plate 137, so that the linking mechanism 150 is not provided with members corresponding to the C-shaped lever 47 and the corresponding pivot 48 fixed to the supporting member 42. Therefore, the flash 25" is simpler than the flash 25 in structure. Moreover, the popped-up position of the flashlight emitter block 90 is determined by the position of the follower pin 139 contacting the upper end of the cam slot 138, so that the flashlight emitter block 90 is stably held in its popped-up position.

The reason why the cam member 200 having the cam plate 137 is not adopted for the other linking mechanism (i.e., the linking mechanism 143) will be hereinafter discussed.

Supposing the right and left side ends of the flashlight emitter block 90 are supported by the respective linking mechanisms each having the cam member 200 having the cam plate 137, the flashlight emitter block 90 will not be smoothly raised to its popped-up position and will thus possibly tilt from its original popped-up position in the case where the follower pin 139 is not precisely positioned relative to the corresponding cam slot 138 in at least one of the two linking mechanisms. Consequently, it will be necessary to precisely position each follower pin 139 relative to the corresponding cam slot 138, which is a troublesome and time-consuming work. For this reason it is preferable that the linking mechanism 150 having the cam member 200 should be positioned only on the left side as viewed in FIG. 14.

In each of the first and third embodiments of the flash 25 and 25", the pair of primary levers 50 (the primary levers 50 and 130 in the third embodiment) are connected to each other through the connecting bar 50a. However, the pair of primary levers can be moved together, without the connecting bar 50a, by means of the rising or retracting movement of the flashlight emitter block 90 itself.

In each of the first and third embodiments of the flash 25 and 25", although the elongated hole (46 or 136) of the L-shaped lever (45 or 135) is fitted on the corresponding pin 99 formed on the flashlight emitter block 90, an elongated hole corresponding to the elongated hole (46 or 136) may be formed on the flashlight emitter block 90 while a pin corresponding to the pin 99 may be formed on the upper end of the L-shaped lever (45 or 135).

Although the photographic lens of the camera 10 is a zoom lens, the photographic lens of the camera 10 may not be a zoom lens but a single focal length lens, as long as the camera 10 has a lens barrel which advances from and retracts into the camera body 11 when the main switch of the camera 10 is turned ON and OFF, respectively.

Although the main switch of the camera 10 is associated with the primary sliding cover 15 so that the main switch is turned ON and OFF when the primary sliding cover 15 is opened and closed, respectively, the main switch of the camera may be provided separately from the primary sliding cover 15. Namely, the main switch may be provided as a type of switch which can be manually operated.

Although the camera 10 is of a type using the APS type film cassette, the camera 10 may be a different type using any other type of film cassette.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A camera comprising:
    a built-in retractable flash movable between a retracted position and a raised position;
    a lens barrel movable between a retracted position and an advanced position;
    a linkage mechanism that links said retractable flash with said movable lens barrel to move said retractable flash between said retracted position and said raised position when said movable lens barrel moves between said retracted position and said advanced position, respectively; and
    a slidable member that slides with respect to said lens barrel and that is guided in a direction of movement of said movable lens barrel, wherein said slidable member is associated with said movable lens barrel to move forward in said direction when said movable lens barrel moves to said advanced position and to move rearward in said direction when said movable lens barrel moves to said retracted position.

2. The camera according to claim 1, further comprising a spring for continuously biasing said slidable member forwardly,
    wherein said movable lens barrel pushes said slidable member rearwardly against a spring force of said spring when said movable lens barrel moves from said advanced position to said retracted position, and
    wherein said slidable member is moved forwardly by said spring force of said spring when said movable lens barrel moves from said retracted position to said advanced position.

3. The camera according to claim 1, wherein said linkage mechanism comprises at least one linkage lever, one end and the other end of which being rotatably connected to a camera body of said camera and a casing of said retractable flash, respectively.

4. The camera according to claim 3, wherein said linkage mechanism further comprises a spring for continuously biasing said at least one linkage lever to rotate in a direction to move said retractable flash towards said raised position.

5. The camera according to claim 1, wherein an upper surface of said retractable flash is substantially flush with an upper surface of a camera body of said camera when said retractable flash is in said retracted position.

6. The camera according to claim 1, wherein said movable lens barrel is driven to move from said retracted position to said advanced position when a main switch of said camera is turned ON, and wherein said movable lens barrel is driven to move from said advanced position to said retracted position when said main switch of said camera is turned OFF.

7. The camera according to claim 1, further comprising:
   a flash accommodation space, formed in a camera body, for accommodating said retractable flash positioned in said retracted position; and
   a battery chamber for accommodating at least one battery cell, said battery chamber being formed behind said accommodation space in said camera body.

8. The camera according to claim 8, further comprising a spool chamber in which a film take-up spool is rotatably supported,
   wherein said flash accommodation space and said battery chamber are formed above said spool chamber.

9. The camera according to claim 1, wherein said slidable member is restricted to move in a range between a frontmost position and a rearmost position, said range being predetermined to be slightly larger than an amount of movement of the retractable flash between said retracted position and said raised position.

10. The camera according to claim 9, further comprising a spring for continuously biasing said slidable member in a direction such that after the retractable flash reaches said retracted position, the slidable member further retreats, preventing said slidable member from having play in a rearmost position of said slidable member.

11. The camera according to claim 1, wherein said slidable member is formed with a rear projection and a front projection, said rear projection and said front projection having engaging surfaces opposed to one another,
   said movable lens barrel being formed with a recess therein in a rearmost end of said movable lens barrel and said linking mechanism being formed with a first arm for operating said linking mechanism, said first arm being positioned forward in said direction of said recess,
   said engaging surface of said rear projection of said slidable member engages said recess and said engaging surface of said front projection engages said first arm.

12. A camera comprising:
   a built-in retractable flash movable between a retracted position in which said retractable flash is retracted into a flash accommodation space formed in a camera body and a raised position in which said retractable flash is raised above said flash accommodation space; and
   a battery chamber for accommodating at least one battery cell, said battery chamber being formed behind said accommodation space in said camera body.

13. The camera according to claim 12, wherein said retractable flash rotates about an axis extending in a direction parallel to a longitudinal direction of said battery chamber to move between said retracted position and said raised position.

14. The camera according to claim 12, wherein said battery chamber is formed in a cylindrical shape having an axis extending in a widthwise direction of said camera body, and wherein a bottom surface of said retractable flash is curved so as to correspond to at least a part of a cylindrical wall which forms said cylindrical battery chamber when said retractable flash is in said flash accommodation space.

15. The camera according to claim 12, further comprising a supporting member for supporting said retractable flash, wherein said supporting member is fixed to said camera body to be positioned in front of said flash accommodation space in said camera body.

16. The camera according to claim 15, further comprising at least one electrical member positioned inside said supporting member.

17. The camera according to claim 14, wherein said at least one electrical member comprises a switch for detecting whether or not said retractable flash is in said raised position.

18. The camera according to claim 12, further comprising a linkage mechanism that connects said retractable flash to said camera body in a movable manner such that said retractable flash is raised above or retracted into said flash accommodation space while rotating about a pivot fixed to said retractable flash.

19. The camera according to claim 18, further comprising:
   a supporting member for supporting said retractable flash, wherein said supporting member is fixed to said camera body to be positioned in front of said flash accommodation space in said camera body; and
   a pivot, fixed to said supporting member, about which at least one movable member of said linkage mechanism is pivoted.

20. The camera according to claim 10, further comprising a spool chamber in which a film take-up spool is rotatably supported,
   wherein said flash accommodation space and said battery chamber are formed above said spool chamber.

21. A camera comprising:
   a built-in retractable flash movable between a retracted position and a raised position; and
   a mechanism for moving said retractable flash between said retracted position and said raised position, wherein said mechanism comprises at least one linkage lever (50), one end and the other end of which being rotatably connected to a camera body of said camera and a casing of said retractable flash, respectively, and a cam plate, fixed to said camera body, for supporting said at least one linkage lever.

22. A camera comprising:
   a built-in retractable flash movable between a retracted position and a raised position;
   a pair of primary levers, one end and the other end of each of said pair of primary levers being rotatably connected to a camera body of said camera and a casing of said retractable flash, respectively;
   a pair of L-shaped levers, a bent portion of each of said pair of L-shaped levers being rotatably connected to a part of a corresponding one of said pair of primary levers between said one end and said the other end thereof, one end of each of said pair of L-shaped levers being rotatably connected to said casing of said retractable flash, and the other end of one of said pair of L-shaped levers being provided with a follower pin;

a cam plate fixed to said camera body and comprising a cam groove with which said follower pin is engaged so that said follower pin is guided along said cam groove; and a third lever, one end and the other end of which being rotatably connected to the other end of the other of said pair of L-shaped levers and said camera body, respectively.

23. The camera according to claim 22, wherein said cam plate is positioned to support one of right and left sides of said casing of said retractable flash which is positioned closer to a center of said camera body.

24. The camera according to claim 22, further comprising a lens barrel movable between a retracted position and an advanced position, wherein one of said pair of primary levers is driven to rotate by a movement of said lens barrel.

25. The camera according to claim 22, wherein said pair of primary levers is connected with each other to move together.

26. The camera according to claim 22, further comprising a device for rotating said casing of said retractable flash about a pair of coaxial pivots, respectively fixed to right and left sides of said casing of said retractable flash, about which said the other ends of said pair of primary levers are respectively pivoted.

27. The camera according to claim 26, wherein said rotating device comprises:

an elongated hole formed on said one end of each of said pair of L-shaped levers; and a pair of coaxial pins formed on said respective sides of said casing of said retractable flash, wherein said pair of coaxial pins are slidably fitted in said elongated holes of said pair of L-shaped levers, respectively.

28. A camera comprising:

a built-in retractable flash movable between a retracted position and a raised position; and a mechanism for moving said retractable flash between said retracted position and said raised position, wherein said mechanism comprises at least one linkage lever, one end and the other end of which being rotatably connected to a C-shaped lever and a casing of said retractable flash, respectively, said C-shaped lever being further pivotable with respect to said camera body and supporting said at least one linkage lever.

29. A camera comprising:

a built-in retractable flash movable between a retracted position and a raised position;

a pair of primary levers, one end and the other end of each of said pair of primary levers being rotatably connected to a camera body of said camera and a casing of said retractable flash, respectively;

a pair of L-shaped levers, a bent portion of each of said pair of L-shaped levers being rotatably connected to a part of a corresponding one of said pair of primary levers between said one end and said the other end thereof, one end of each of said pair of L-shaped levers being rotatably connected to said casing of said retractable flash, and the other end of each of said pair of L-shaped levers being provided with a pivot pin;

a pair of C-shaped levers, one end of each being pivotably connected to a corresponding one of said pivot pins of said pair of L-shaped levers, and the other end of each being and pivotably connected to said camera body.

30. The camera according to claim 29, further comprising a lens barrel movable between a retracted position and an advanced position, wherein one of said pair of primary levers is driven to rotate by a movement of said lens barrel.

31. The camera according to claim 29, wherein said pair of primary levers is connected with each other to move together.

32. The camera according to claim 29, further comprising a device for rotating said casing of said retractable flash about a pair of coaxial pivots, respectively fixed to right and left sides of said casing of said retractable flash, about which said other ends of said pair of primary levers are respectively pivoted.

33. The camera according to claim 32, wherein said rotating device comprises:

an elongated hole formed on said one end of each of said pair of L-shaped levers; and a pair of coaxial pins formed on said respective sides of said casing of said retractable flash, wherein said pair of coaxial pins are slidably fitted in said elongated holes of said pair of L-shaped levers, respectively.

34. A camera comprising:

a built-in retractable flash movable between a retracted position and a raised position;

a pair of position swinging mechanisms provided to opposing lateral sides of said retractable flash, one end and the other end of each of said pair of position swinging mechanisms being associated with a camera body of said camera and a casing of said retractable flash, respectively, said pair of position swinging mechanisms swinging said retractable flash up and down with respect to said camera body;

a pair of posture swinging mechanisms provided to opposing lateral sides of said retractable flash, one end and the other end of each of said pair of posture swinging mechanisms being associated with said camera body of said camera and said casing of said retractable flash, respectively, said pair of posture swinging mechanisms swinging said retractable flash to change an angular position of said flash with respect to said camera body, each of said pair of position swinging mechanisms being swingable along an arc about a first common axis, and each of said pair of posture swinging mechanisms being swingable along an arc about a second common axis, and both of said first common axis and said second common axis being perpendicular to a direction in which said retractable flash is directed in said raised position.

35. The camera according to claim 34, wherein said pair of position swinging mechanisms comprise:

a pair of primary levers, one end and the other end of each of said pair of primary levers being rotatably connected to a camera body of said camera at said first axis and a casing of said retractable flash, respectively.

36. The camera according to claim 34, wherein said pair of posture swinging mechanisms comprise:

a pair of L-shaped levers, a bent portion of each of said pair of L-shaped levers being rotatably connected to a part of a corresponding one of said pair of primary levers between said one end and said the other end thereof, one end of each of said pair of L-shaped levers being rotatably connected to said casing of said retractable flash, and the other end of one of said pair of L-shaped levers being provided with a follower pin;

a cam plate fixed to said camera body and comprising a cam groove, in the shape of an arc about said second axis, with which said follower pin is engaged so that said follower pin is guided along said cam groove; and a third lever, one end and the other end of which being rotatably connected to the other end of the other of said pair of L-shaped levers and said camera body coaxial with said second axis, respectively.

37. The camera according to claim 36, wherein said pair of posture swinging mechanisms comprise:

a pair of L-shaped levers, a bent portion of each of said pair of L-shaped levers being rotatably connected to a part of a corresponding one of said pair of primary levers between said one end and said the other end thereof, one end of each of said pair of L-shaped levers being rotatably connected to said casing of said retractable flash, and the other end of each of said pair of L-shaped levers being provided with a pivot pin;

a pair of C-shaped levers, one end of each being pivotably connected to a corresponding one of said pivot pins of said pair of L-shaped levers, and the other end of each being and pivotably connected to said camera body at said second axis.

* * * * *